United States Patent
Suh et al.

(10) Patent No.: US 7,010,168 B2
(45) Date of Patent: Mar. 7, 2006

(54) APPARATUS FOR PREDICTION CODING OR DECODING IMAGE SIGNAL AND METHOD THEREFOR

(75) Inventors: Ki-bum Suh, Seoul (KR); Bon-tae Koo, Daejon (KR); Seong-mo Park, Daejon (KR); Seong-min Kim, Daejon (KR); Ig-kyun Kim, Daejon (KR); Kyung-soo Kim, Daejon (KR)

(73) Assignees: Electronics and Telecommunications Research Institute, (KR); VK Corporation, (KR)

( * ) Notice: Subject to any disclaimer, the term of this patent is extended or adjusted under 35 U.S.C. 154(b) by 670 days.

(21) Appl. No.: 10/098,213

(22) Filed: Mar. 15, 2002

(65) Prior Publication Data

US 2003/0118239 A1 Jun. 26, 2003

(30) Foreign Application Priority Data

Dec. 26, 2001 (KR) .............................. 2001-85034

(51) Int. Cl.
*G06K 9/36* (2006.01)
(52) U.S. Cl. .................................................. 382/238
(58) Field of Classification Search ........ 382/232–233, 382/235–236, 238, 248, 250–251; 348/384.1, 348/394.1, 395.1, 400.1–403.1, 407.1–416.1, 348/420.1–421.1, 425.3, 426.1, 430.1–431.1, 348/699, 715, 717; 375/240.12–240.13, 375/240.14–240.15, 240.16, 240.18, 240.2, 375/240.22, 240.24, 240.25, 240.26; 386/109, 386/111, 112
See application file for complete search history.

(56) References Cited

U.S. PATENT DOCUMENTS

| 5,623,311 | A | * | 4/1997 | Phillips et al. ......... 375/240.25 |
| 6,005,622 | A | | 12/1999 | Haskell et al. .............. 348/400 |
| 6,292,588 | B1 | | 9/2001 | Shen et al. |
| 6,310,897 | B1 | * | 10/2001 | Watanabe et al. ........... 370/522 |

(Continued)

FOREIGN PATENT DOCUMENTS

EP 0863673 9/1998

(Continued)

*Primary Examiner*—Jose L. Couso
(74) *Attorney, Agent, or Firm*—Blakely Sokoloff Taylor & Zafman

(57) ABSTRACT

A hardware structure for adaptively prediction coding an image signal using spatial correlation and a method therefor are provided. The prediction coding apparatus has a packet change detection unit which determines whether or not blocks used to determine a prediction direction for a current block for which prediction is currently performed is included in a same packet to which the current block belongs; a prediction reference value providing unit which provides a prediction reference value used in prediction according to the result of determination by the packet change detection unit; and a prediction calculation unit which outputs a predictive coded value or a predictive decoded value using the prediction reference value provided by the prediction reference value providing unit and the DCT component of the current block according to an operation mode. According to the apparatus and method, the size of a prediction apparatus is reduced, and one apparatus is used both in coding and decoding.

15 Claims, 14 Drawing Sheets

U.S. PATENT DOCUMENTS

| | | | |
|---|---|---|---|
| 6,466,732 B1 * | 10/2002 | Kimura et al. | 386/52 |
| 6,493,392 B1 * | 12/2002 | Moon et al. | 375/240.27 |
| 6,530,055 B1 * | 3/2003 | Fukunaga | 714/746 |
| 6,556,627 B1 * | 4/2003 | Kitamura et al. | 375/240.26 |
| 6,567,471 B1 * | 5/2003 | Yoshinari | 375/240.26 |
| 6,654,421 B1 * | 11/2003 | Hanamura et al. | 375/240.26 |
| 6,792,046 B1 * | 9/2004 | Hatano et al. | 375/240.24 |
| 6,795,503 B1 * | 9/2004 | Nakao et al. | 375/240.16 |

FOREIGN PATENT DOCUMENTS

| | | |
|---|---|---|
| JP | 2000-167590 | 12/2001 |

\* cited by examiner

OPERATION FOR MACRO BLOCK 3 (packet_change SIGNAL=0)

|  | 0 | 1 | 2 | 3 | 4 | 5 | 6 | 7 | 8 | 9 | 10 | ... | |
|---|---|---|---|---|---|---|---|---|---|---|---|---|---|
| VALUE STORED IN REGISTER | 0 | 0 | 0 | 0 | 1 | 0 | 0 | 0 | 0 | 0 | 0 | ... | |
| SELECT SIGNAL | 1 | 1 | 1 | 0 | 1 | 1 | 1 | 1 | 1 | 1 | 1 | ... | |
| AND GATE OUTPUT | 0 | 0 | 0 | 0 | 1 | 0 | 0 | 0 | 0 | 0 | 0 | ... | |
| 1st OR GATE OUTPUT | 1 ||||||||||||  |
| 2nd OR GATE OUTPUT | 1 |||||||||||| UPPER PACKET: DIFFERENT PACKET |
| 3rd OR GATE OUTPUT | 1 |||||||||||| UPPER LEFT-HAND PACKET: DIFFERENT PACKET |

FIG. 6C

OPERATION FOR MACRO BLOCK 4 (packet_change SIGNAL=0)

| | 0 | 1 | 2 | 3 | 4 | 5 | 6 | 7 | 8 | 9 | 10 | ... | |
|---|---|---|---|---|---|---|---|---|---|---|---|---|---|
| VALUE STORED IN REGISTER | 0 | 0 | 0 | 0 | 1 | 0 | 0 | 0 | 0 | 0 | 0 | ... | |
| SELECT SIGNAL | 1 | 1 | 1 | 1 | 0 | 1 | 1 | 1 | 1 | 1 | 1 | ... | |
| AND GATE OUTPUT | 0 | 0 | 0 | 0 | 0 | 0 | 0 | 0 | 0 | 0 | 0 | ... | |
| 1st OR GATE OUTPUT | 0 ||||||||||| | |
| 2nd OR GATE OUTPUT | 0 ||||||||||| | UPPER PACKET: SAME PACKET |
| 3rd OR GATE OUTPUT | 1 ||||||||||| | UPPER LEFT-HAND PACKET: DIFFERENT PACKET |

FIG. 6D

OPERATION FOR MACRO BLOCK 5 (packet_change SIGNAL=0)

| | 0 | 1 | 2 | 3 | 4 | 5 | 6 | 7 | 8 | 9 | 10 | ... | |
|---|---|---|---|---|---|---|---|---|---|---|---|---|---|
| VALUE STORED IN REGISTER | 0 | 0 | 0 | 0 | 1 | 0 | 0 | 0 | 0 | 0 | 0 | ... | |
| SELECT SIGNAL | 1 | 1 | 1 | 1 | 1 | 0 | 1 | 1 | 1 | 1 | 1 | ... | |
| AND GATE OUTPUT | 0 | 0 | 0 | 0 | 1 | 0 | 0 | 0 | 0 | 0 | 0 | ... | |
| 1st OR GATE OUTPUT | 1 ||||||||||| | |
| 2nd OR GATE OUTPUT | 1 ||||||||||| | UPPER PACKET: DIFFERENT PACKET |
| 3rd OR GATE OUTPUT | 1 ||||||||||| | UPPER LEFT-HAND PACKET: DIFFERENT PACKET |

FIG. 9

| BLOCK INDEX | 0 | 1 | 2 | 3 | 4 | 5 |
|---|---|---|---|---|---|---|
| LOCATION IN UPPER-LEFT MEMORY FOR STORING DC COMPONENT OF UPPER BLOCK | 0 | 1 | 2 | 3 | 4 | 5 |
| LOCATION REFERRING TO UPPER-LEFT DC COMPONENT | 1 | 0 | 3 | 2 | 4 | 5 |

FIG. 10A

| 0 | 1 | 4 | 5 | 8 | 9 |
|---|---|---|---|---|---|
| 2 | 3 | 6 | 7 | 10 | 11 |
| 12 | 13 | 16 | 17 | 20 | 21 |
| 14 | 15 | 18 | 19 | 22 | 23 |

FIG. 10B

APPARATUS FOR PREDICTION CODING OR DECODING IMAGE SIGNAL AND METHOD THEREFOR

BACKGROUND OF THE INVENTION

1. Field of the Invention

The present invention relates to a hardware structure for adaptively prediction coding an image signal using spatial correlation and a method therefor.

2. Description of the Related Art

In general, an image signal has higher redundancy (reducible information). In order to compress the image signal, Moving Picture Experts Group (MPEG) uses spatial correlation, that is, prediction in a frame, and temporal correlation, that is, prediction between frames.

Among the compression methods, a compression method using spatial correlation in MPEG-4 will now be explained referring to FIGS. 1 and 2

FIG. 1 is a block diagram of a data flow for MPEG-4 coding.

A Forward Discrete Cosine Transform (FDCT) process is performed on an input image signal in an FDCT unit 101. A quantizing unit 102 receives Alternative Current (AC) coefficients and Direct Current (DC) coefficients from the FDCT unit 101, and quantizes the AC and DC coefficients using a quantization table. As the DCT coefficient of a high frequency term of an image signal becomes '0' through quantization, information of the high frequency term is deleted such that data is compressed.

An AC/DC predicting unit 103 receives quantized coefficients, and performs a Differential Pulse Code Modulation (DPCM) process on the AC and the DC coefficients. The result of DPCM process is scanned in a scanning unit 104, and stored in a quantized coefficient buffer 105.

A variable-length coding unit 106 performs variable-length code on the scanned data, and generates a bit stream. At this time, the bit stream is formed with a plurality of packets containing data on a predetermined number of macro blocks.

Meanwhile, in order to reconstruct a scene for motion prediction with respect to temporal correlation, the quantized signal is processed through an inverse quantizing unit 111 and an inverse discrete cosine transform unit 112, and then stored in a frame memory (not shown) in a restorer 113.

FIG. 2 is a block diagram of a data flow for MPEG-4 decoding.

In decoding, a bit stream which is input in units of packets is variable-length decoded in a variable-length decoding unit 201, and stored in a quantized coefficient buffer 202. The stored values are read through inverse scanning by an inverse scanning unit 203, and decoded in an AC/DC predicting unit 204. The decoded result which is the same value as the output of the quantizing unit 102 of FIG. 1, is processed through the inverse quantizing unit 205 and inverse discrete cosine transform unit 206, and restored to a scene in a restoring unit 207.

In order to compress an image signal, MPEG also uses a prediction coding method in addition to the discrete cosine transform and quantization. The prediction coding is a method for reducing the amount of data by using differential coding which codes differences of the AC and DC coefficients output from the quantizing unit 102 and the AC and DC coefficients of a left-hand block, or an upper block.

In MPEG-2, only DC value of the previous macro block is referred to and only DC components are coded using DPCM. In MPEG-4, however, both AC components and DC components are adaptively predictive coded. Referring to FIG. 3, a method for predictive coding AC/DC components in the AC/DC predicting unit 103 of FIG. 1 will now be explained.

Referring to FIG. 3, block X 304 of 8×8 block indicates a current block at the present timing. Block A 303 indicates the preceding block located adjacently in the left-hand side of block X 304, block B 301 in the upper left-hand side of block X 304, and block C 302 in the upper side of block X 304. Grids of each block represent DC components.

In a process for predicting a DC component, a predicted value of a DC component is adaptively selected with respect to the gradient of DC components between blocks adjacent to a current block, in horizontal and vertical directions.

That is, A predicted value of the DC component of block X 304 is determined using the difference between the inverse quantized DC component of block A 303 and the inverse quantized DC component of block B 304, and the difference between the inverse quantized DC component of block C 302 and the inverse quantized DC component of block B 304 That is, the predicted value is determined by the following procedure:

if $(|FA[0][0] - FB[0][0]| < |FB[0][0] - FC[0][0]|)$ $$FB[0][0] = FC[0][0]$$

else $$FP[0][0] = FA[0][0]$$

where, $FA[0][0]$, $FB[0][0]$, and $FC[0][0]$ are inverse quantized DC components of block A, block B, and block C, respectively, and $FP[0][0]$ is a predicted value of the DC component of block X.

If an adjacent block is not included in the same packet, a predicted value of the DC component of block X is not determined in the above method, but determined using a predetermined reference value. Generally, 1024 is used for the reference value. Thus, even when error occurs in data contained in a packet, propagation of the error to the other packets is prevented.

Using thus obtained predicted value, prediction error $PQFX[0][0]$ is obtained as the following equation:

$$PQFX[0][0] = QFX[0][0] - Fb[0][0] // dc\_scaler$$

where, $QFX[0][0]$ is the quantized DC component of block X, and dc_scaler is the quantization factor of block X. $PQFX[0][0]$ is variable-length coded by the Huffman coding method. When the image is restored, $Fp[0][0]//dc\_scaler$ is added to $PQFX[0][0]$ and the quantized DC coefficient of block X is reproduced. Prediction of a DC coefficient in an intra-block is performed for an entire block (brightness and color-difference components) included in a macro block.

Prediction of an AC component is performed referring to a block which is determined by the DC component prediction. That is, when the DC component is predicted using block A 303, AC coefficients of the first column 311 of block A are taken as predicted values, and are DCPM processed with the AC coefficients of the first column 312 of block X. When the DC component is predicted using block C 302, AC coefficients of the first column 313 of block C are taken as predicted values, and are DCPM processed with the AC coefficients of the first line 314 of block X.

An example of an equation when prediction is performed based on block A is as follows:

$$PQFX[0][i]=QFX[0][i]-(QFA[0][i]*QPA)//QPX$$

Thus, in order to perform AC/DC prediction, first, it should be determined whether or not an adjacent packet is included in a packet in which a current block is included. In the prior art, all packet numbers (9 bits) located in a slice over a macro block in which prediction is currently performed are stored and in order to determine a packet change, the packet number of the current macro block is compared with the packet number of a macro block desired to be compared. Accordingly, a large space should be allocated to determine a packet change.

Also, when it is determined that an adjacent packet is included in the same packet in which a block for which prediction is currently performed, prediction is performed using DCT components of a left-hand block and a upper block of the current block, thereby storage space for storing DCT components of the left-hand block and the upper block of the current block is needed. However, if the DCT components of adjacent blocks are stored in one line memory space, the DCT component of a upper left-hand block of the current block is not available when prediction of the DCT component of the current block is performed, since the DCT component is stored in a way that the DCT component of the left-hand block is stored in an area in which the DCT component of the upper left-hand block is stored, overlapping the stored DCT component, after prediction of the DCT component of left-hand block is performed Therefore, all DCT components of the blocks of two lines should be stored, which causes increase in circuit area and power consumption such that the method is not appropriate to application fields such as a portable terminal.

SUMMARY OF THE INVENTION

To solve the above problems, it is a first objective of the present invention to provide an apparatus which reduces the area of a circuit for performing AC/DC prediction and efficiently utilizes a memory.

It is a second objective of the present invention to provide a method which reduces the area of a circuit for performing AC/DC prediction and efficiently utilizes a memory.

To accomplish the first objective of the present invention, there is provided an apparatus for predicting a Discrete Cosine Transform (DCT) component of an image signal in an apparatus for prediction coding or decoding an image signal, the apparatus for predicting a DCT component having a packet change detection unit which determines whether or not blocks used to determine a prediction direction for a current block for which prediction is currently performed is included in a same packet to which the current block belongs; a prediction reference value providing unit which provides a prediction reference value used in prediction according to the result of determination by the packet change detection unit; and a prediction calculation unit which outputs a predictive coded value or a predictive decoded value using the prediction reference value provided by the prediction reference value providing unit and the DCT component of the current block according to an operation mode.

Also to accomplish the first objective of the present invention, there is provided a packet change detection apparatus in an apparatus for prediction coding or decoding an image signal, the packet change detection apparatus having a first packet change signal output unit which outputs a first packet change signal indicating whether or not the packet of a macro block to the left of the current macro block is the same as the packet of the current macro block, using a current packet change signal indicating whether or not the packet to which the current macro block belongs changed; a storage unit which is formed with a plurality of storage areas of which number corresponds to the number of macro blocks forming X axis of a scene, and stores the current packet change signal in a storage area corresponding to a location of the current macro block on the X axis of the scene; a selection signal generating unit which generates a selection signal indicating the location value on the X axis of the scene of the current macro block; a first calculation unit which calculates a first output value using the selection signal and values stored in the storage areas; a second calculation unit which outputs a second packet change signal indicating whether or not the packet of a macro block immediately above the current macro block is the same as the packet to which the current macro block belongs, using the first output value and the current packet change signal; and a third calculation unit which outputs a third packet change signal indicating whether or not the packet of a macro block immediately above and to the left of the current macro block is the same as the packet to which the current macro block belongs, using the second packet change signal and a value stored in a storage area corresponding to the location on the X axis of the scene of the current macro block among storage areas forming the storage unit.

Also to accomplish the first objective of the present invention, there is provided a prediction reference value providing apparatus which provides a prediction reference value for predictive coding or decoding an image signal to a calculation apparatus which performs prediction, the prediction reference value providing apparatus having a horizontal direction memory unit which has storage areas capable of storing horizontal DCT components of a color difference signal block of a slice forming a scene and horizontal DCT components of any one brightness signal block of an upper brightness signal block and a lower brightness signal block of a slice; a vertical direction memory unit which has storage areas capable of storing vertical DCT components of any one column of vertical DCT components forming a slice; an upper-left direction memory unit which has storage areas capable of storing the Direct Current (DC) component of a block immediately above and to the left of the current block for which prediction is currently performed; and a memory control unit which stores the DC component of a block immediately above the current block in the upper-left memory unit, stores the horizontal DCT component of the current block in the horizontal direction memory unit, and stores the vertical DCT component of the current block in the vertical direction memory unit.

To accomplish the second objective of the present invention, there is provided a method for predicting an image signal in a method for predictive coding or predictive decoding an image signal using a prediction memory which has a horizontal direction memory unit which has storage areas capable of storing horizontal DCT components of a slice forming a scene, a vertical direction memory unit which has storage areas capable of storing a vertical DCT component, and an upper-left memory unit storage areas capable of storing a DC component of a block immediately above and to the left of a current block for which prediction is performed, the method for prediction an image signal includes (a) determining whether or not the packet to which the current macro block belongs is different from the packet of a macro block to the left of the current macro block, the macro block immediately above and to the left of the current block, or a macro block immediately above the current macro block, using a current packet change signal indicating whether or not the packet to which the current macro block belongs changed; (b) if the packet to which the current macro block belongs is the same as the packet of the macro block to the left of the current macro block, the macro block immediately above and to the left of the current block, or the macro block immediately above the current macro block, determining the direction of prediction, using the DC component of the block to the left of the current block stored in the vertical direction memory unit, the DC component of the block immediately above the current block stored in the horizontal direction memory unit, and the DC component of the block immediately above and to the left of the current block; (c) if the prediction direction is a first direction, outputting a reference prediction value by using a value stored in the vertical direction memory unit and if the prediction direction is a second direction, outputting a reference prediction value by using a value stored in the horizontal direction memory unit; (d) if the packet to which the current macro block belongs is different from the packet of the macro block to the left of the current macro block, the macro block immediately above and to the left of the current block, or the macro block immediately above the current macro block, outputting a predetermined reference value; (e) performing prediction calculation by using the reference prediction value of step (c) or the predetermined reference value of step (c) with the DCT component of the current block; and (f) storing the DCT component of the current block in the prediction memory.

Also, to accomplish the second objective of the present invention, there is provided another method for determining a prediction reference value which is provided by using a current packet change signal, in which a storage unit which is formed with a plurality of storage areas of which number corresponds to the number of macro blocks forming X axis of a scene, and stores the current packet change signal in a storage area corresponding to a location of the current block on the X axis of the scene is included and a prediction reference value is provided by determining whether or not the packet to which the current macro block belongs is the same as the packet of a macro block to the left of the current macro block, a macro block immediately above and to the left of the current macro block, or a macro block immediately above the current macro block, the method for determining a prediction reference value including (a) generating a selection signal indicating the location value on the X axis of the scene of the current macro block; (b) outputting a first output value using the selection signal and a value stored in the storage unit; (c) outputting a first packet change signal indicating whether or not the packet of the macro block to the left of the current macro block is the same as the packet of the current macro block, using the current packet change signal indicating whether or not the packet to which the current macro block belongs changed; (d) outputting a second packet change signal indicating whether or not the packet of the macro block immediately above the current macro block is the same as the packet to which the current macro block belongs, using the first output value and the packet change signal; (e) outputting a third packet change signal indicating whether or not the packet of the macro block immediately above and to the left of the current macro block is the same as the packet to which the current macro block belongs, using the second packet change signal and a value stored in a storage area corresponding to the location on the X axis of the scene of the current macro block among storage areas forming the storage unit; (f) if any one of the first through the third packet change signal indicates that the packet to which the current macro block belongs is different from the packet of a macro block which is compared with the current macro block, outputting a predetermined reference value as the prediction reference value; and (g) if any one of the first through the third packet change signal indicates that the packet to which the current macro block belongs is the same as the packet of a macro block which is compared with the current macro block, reading the prediction reference value from a predetermined prediction memory and outputting the prediction reference value.

Also, to accomplish the second objective of the present invention, there is provided another method for controlling a prediction memory in a method for predictive coding or prediction decoding an image signal using a prediction memory which has a horizontal direction memory unit which has storage areas capable of storing horizontal DCT components of a slice forming a scene, a vertical direction memory unit which has storage areas capable of storing vertical DCT components, and an upper-left memory unit storage areas capable of storing a DC component of a block immediately above and to the left of a current block for which prediction is performed, the method for controlling a prediction memory includes (a) storing the DC component of a block immediately above the current block in the upper-left memory unit, storing the horizontal DCT component of the current block in the horizontal direction memory unit, and storing the vertical DCT component of the current block in the vertical direction memory unit.

To accomplished the above objectives of the present invention, there is provided a computer readable medium having embodied thereon a computer program for implementing the above-described methods.

BRIEF DESCRIPTION OF THE DRAWINGS

The above objects and advantages of the present invention will become more apparent by describing in detail preferred embodiments thereof with reference to the attached drawings in which:

FIGS. 6a through 6d are diagrams for explaining the operation of a packet change detection of the present invention;

FIG. 9 is a table of the locations for read and write in an upper left memory;

FIGS. 10a and 10b are diagrams for explaining the control of a prediction memory;

DESCRIPTION OF THE PREFERRED EMBODIMENTS

Figure 4:
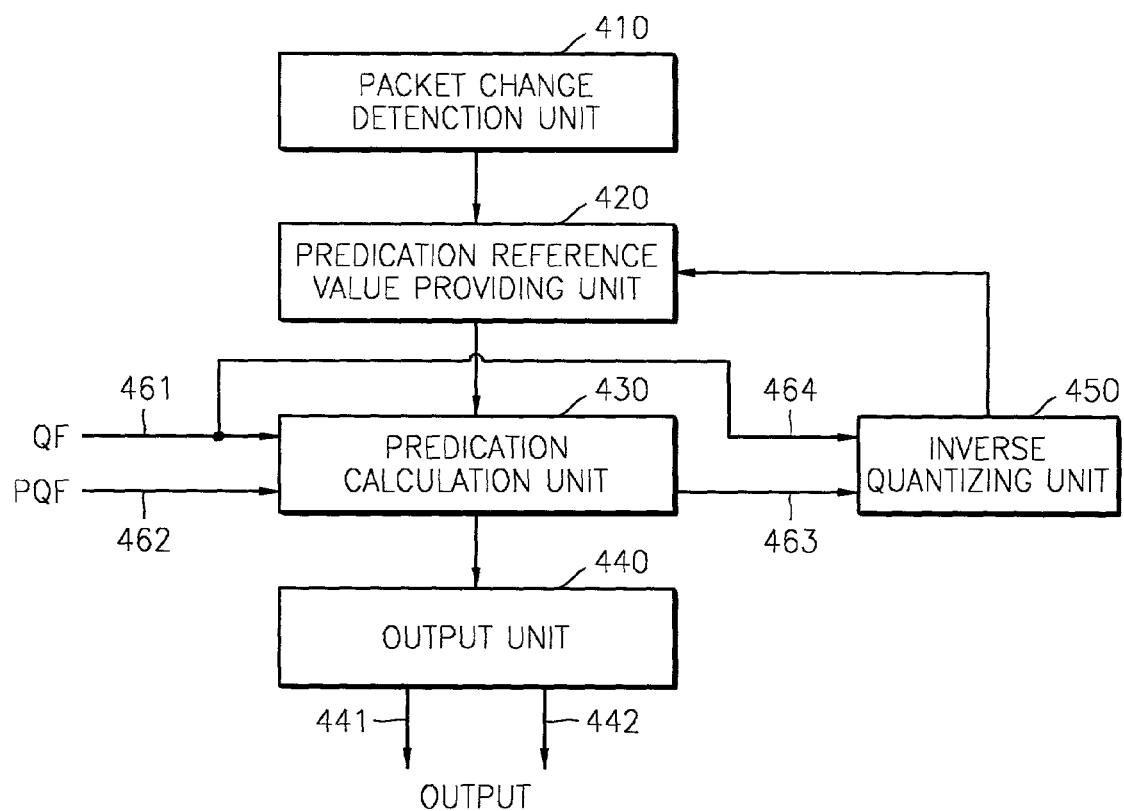
FIG. 4 is a block diagram of an AC/DC prediction apparatus of the present invention.

An AC/DC prediction apparatus of the present invention of FIG. 4 has a packet change detection unit 410, a prediction reference value providing unit 420, a prediction calculation unit 430, an inverse quantizing unit 450, and an output unit 440, and is used both for a coding apparatus and a decoding apparatus.

The packet change detection unit 410 determines whether or not a current macro block for which prediction is performed is included in a packet in which a left-hand macro block, an upper left-hand macro block, or an upper macro block of the current macro block is included.

The prediction reference value providing unit 420 provides a prediction reference value for prediction according to the determined result of the packet change detection unit 410. That is, if it is determined that the current macro block is not included in a packet in which the macro block to the left of the current macro block, the macro block to the left of and above the current macro block, or the macro block above the current macro block is included, the prediction reference value providing unit 420 provides a predetermined reference value as a prediction reference value. If it is determined that the current macro block is included in a packet in which the macro block to the left of the current macro block, the macro block to the left of and above the current macro block, or the macro block above the current macro block is included, the prediction reference value providing unit 420 provides a value stored in the prediction memory as a prediction reference value.

According to an operation mode, the prediction calculation unit 430 outputs a predictive coded value or a predictive decoded value, using the prediction reference value provided by the prediction reference value providing unit 420 and the DCT component of the current block.

If the operation mode is a coding mode, the prediction calculation unit 430 receives the quantized value (QF) 461 of the DCT component of the current block from the quantizing unit 102, and outputs a value obtained by subtracting a value, which is obtained by dividing the prediction reference value by a predetermined quantization value, from the quantized value (OF) 461, that is, outputs a value obtained by DPCM processing. If the operation mode is a decoding mode, the prediction calculation unit 430 receives the quantized and DPCM processed value (PQF) 462 of the current block from the inverse scanning unit 202, and outputs a value obtained by adding the value (PQF) 462 and a value obtained by dividing the prediction reference value by a predetermined quantization value.

If the operation mode is a coding mode, the inverse quantizing unit 450 receives the quantized value (QF) 464 of the DCT component of the current block, inverse quantizes the value (QF) 464 by multiplying the value (QF) 464 by a quantization value, and sends the inverse quantized value to the prediction reference value providing unit 420. If the operation mode is a decoding mode, the inverse quantizing unit 450 receives a value 463 output from the prediction calculation unit 430, inverse quantizes the value 463 by multiplying the value 463 by a quantization value, and sends the inverse quantized value to the prediction reference value providing unit 420

Meanwhile, the output unit 440 receives a value from the prediction calculation unit 430, and outputs the value according to an operation mode. If the operation mode is a coding mode, the output unit 440 outputs the value to the scanning unit 104 and if the operation mode is a decoding mode, the output unit 440 outputs the value to the inverse quantizing unit 442.

The operation of each module will now be explained in detail.

Figure 5:
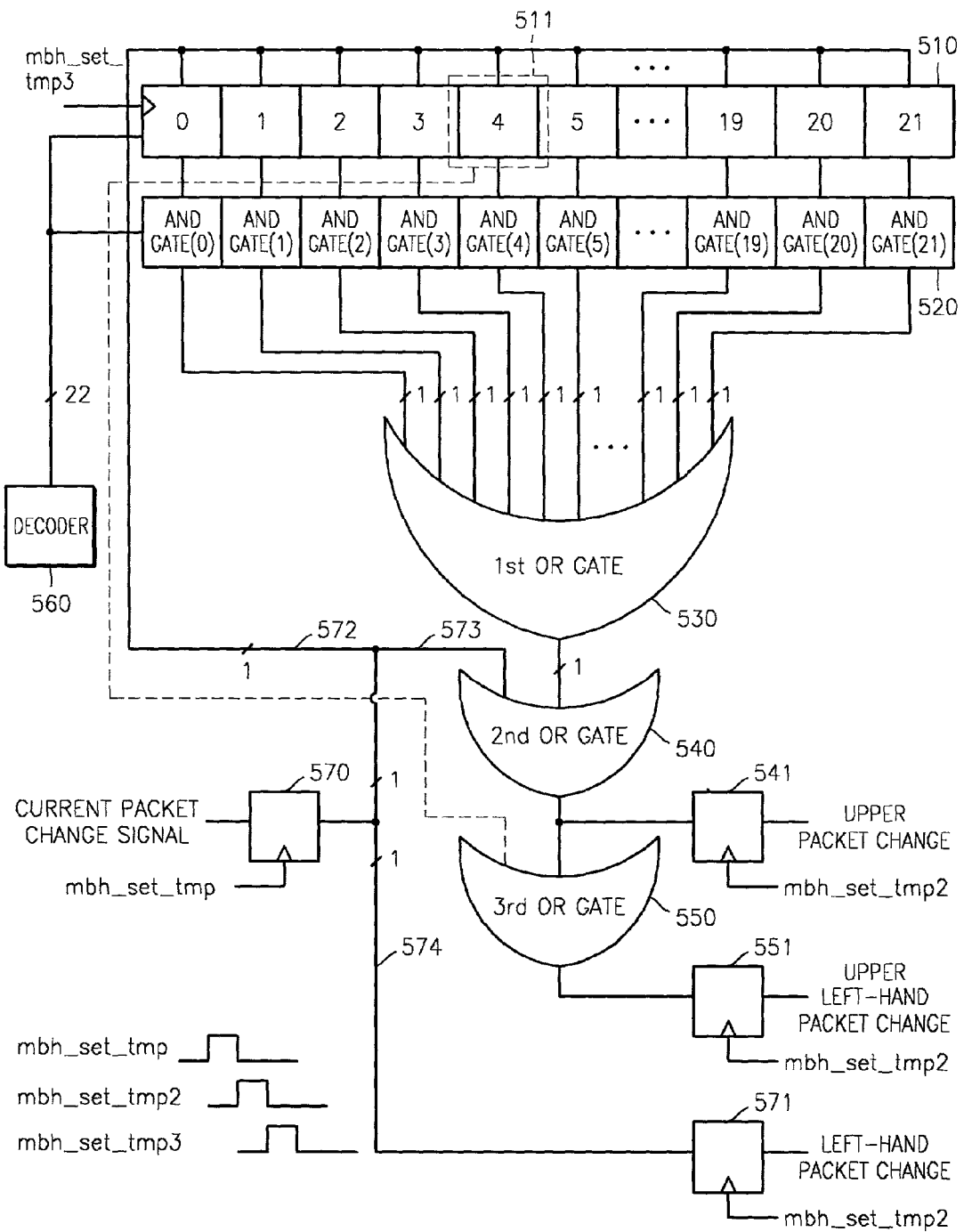
FIG. 5 is a block diagram of a packet change detection unit of the present invention.

FIG. 5 is a block diagram of a packet change detection unit of the present invention.

In the present embodiment, a case in which it is determined whether or not macro block 4 (the fifth macro block) among 22 macro blocks that form the breadth of a scene in the current Common Interchange Format (CIF) is included in a packet in which a macro block to the left of macro block 4, a macro block to the left of and above macro block 4, or a macro block above macro block 4, will be explained.

The circuit of FIG. 5 for detecting a packet change has a register unit 510 which is formed with 22 one bit registers corresponding to 22 macro blocks forming the breadth of a scene in the CIF format, an AND gate unit 520 which is formed with 22 AND gates for ANDing a selection signal and the values in the registers, a first OR gate 530 which ORs the output values of the AND gates 520, a second OR gate 540 which ORs the output values of the first OR gate 530 and a current packet change signal, a third OR gate 550 which ORs the output values of the second OR gate 540 and a value 511 in a register corresponding to the current macro block for which prediction is currently performed, a decoder 560 which generates the selection signal with respect to the location of the current macro block, and flip-flops 570, 541, 551, and 571.

In order for the packet change detection unit 410 of the present invention to determine whether or not the current macro block is included in a packet in which a left-hand macro block of the current macro block, an upper left-hand macro block of the current macro block, or an upper macro block of the current macro block is included, 3 sequential clock signals are needed, and in FIG. 5, a first clock (mbh_set_tmp), a second clock (mbh_set_tmp2), and a third clock (mbh_set_tmp3) represents the three signals.

The operation of the circuit will now be explained.

First, whenever a macro block is processed, if the packet of the current macro block is different from the packet of the previous macro block, a current packet change signal is input as a "high" logic level to the flip-flop 570 at the first clock (mbh_set_tmp), and if the packet of the current macro block is the same as the packet of the previous macro block, the current packet change signal is input as a "low" logic level to the flip-flop 570 at the first clock (mbh_set_tmp).

At the second clock (mbh_set_tmp2) which is generated one clock after the first clock (mbh_set_tmp) by the flip-flop 571, the current packet change signal is output as a left packet change signal that indicates whether or not the packet of the current macro block is different from the packet of a macro block to the left of the current macro block.

Also, at the third clock (mbh_set_tmp3) which is generated two clocks after the first clock (mbh_set_tmp), the current packet change signal is stored in a register among the 22 registers, the register corresponding to the location of the current macro block, by a selection signal generated by the decoder 550.

The decoder 550 makes a bit corresponding to the macro block, which is currently processed, a "low" logic level, and the remaining bits a "high" logic level and outputs the selection signal. For example, if prediction of macro block 4 is being performed, the selection signal becomes '1111011111111111111111'.

Each register of the packet change register unit 510 receives one bit of the selection signal, and if a corresponding bit of the selection signal is a "low" logic level, the register is activated. Then, at the third clock (mbh_set_tmp3), the current packet change signal is stored.

The selection signal is also input to the AND gate unit 520. Each AND gate corresponding to a macro block receives and ANDs an output signal of a register of the packet change register unit 510, the register corresponding to the macro block, and a selection signal generated in the decoder 560, and outputs the result.

The first OR gate 530 receives and ORs the output of the AND gate unit 520, and outputs the result.

The second OR gate 540 receives and ORs the output of the first OR gate 530 and the current packet change signal and outputs the result. If the output signal of the second OR gate 540 is a "high" logic level, it means that the packet to which a macro block above the current macro block belongs is different from the packet to which the current macro block belongs, and if the output signal is a "low" logic level, it means that the packet to which the macro block above the current macro block belongs is the same as the packet to which the current macro block belongs.

The third OR gate 550 receives and ORs the output signal of the second OR gate 540 and a value stored in the register 511 corresponding to the current macro block, and outputs the result. If the result is a "high" logic level, it means that the packet to which a macro block to the left of and above the current macro block belongs is different from the packet to which the current macro block belongs, and if the result if a "low" logic level, it means that the packet to which the macro block to the left of and above the current macro block belongs is the same as the packet to which the current macro block belongs.

Thus, calculated signal indicating a packet change is output to the outside at the second clock (mbh_set_tmp2) which is delayed for one clock from the input clock (mbh_set_tmp) of the current packet change signal.

The operations for determining whether or not the macro block above the current block or the macro above the current block is included in the same packet to which the current block belongs will now be explained referring to FIGS. 6a through 6d.

Figures 6A, 6B:
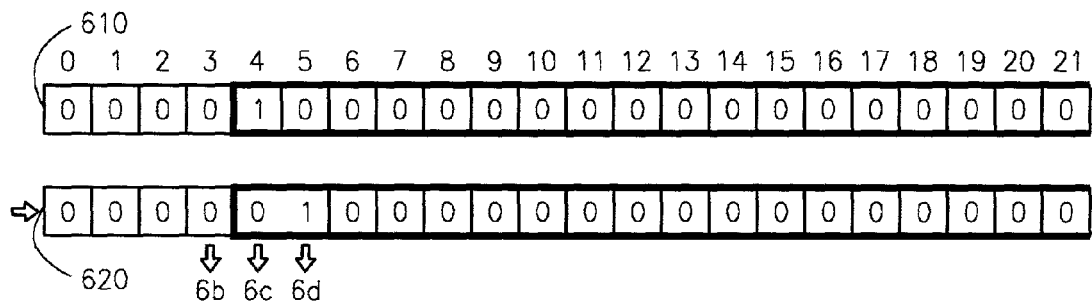

FIG. 6a shows two slices of a plurality of slices forming a scene. Each slice is formed of 22 macro blocks. It is assumed that a new packet begins from macro block 4 of the upper slice 610 and continues to macro block 4 of the lower slice 620, and another new packet begins from macro block 5 of the lower slice 620.

FIG. 6b is a table which shows the operation for predicting macro block 3 of the lower slice 620.

Since there is no packet change in macro block 3, the current packet change signal is input as a "low" logic level. At the first clock (mbh_set_tmp) when the current packet change signal is input, the current packet change signal of the current macro block is not stored in the packet change register yet, and the packet change signal ('0') of macro block 3 of the upper slice is still stored in packet change register 3 Also in the packet change registers 4 through 21 after packet change register 3, packet change signals of the macro blocks of the upper slice are stored. Therefore, the value stored in the packet register unit 510 is '00001000000000000000000' starting at packet change register 0 in increasing order.

Since prediction for macro block 3 is currently performed, the selection signal becomes '11101111111111111111111'.

Each AND gate 520 receives a value stored in a register of the packet change register unit 510 and a corresponding bit of the selection signal, ANDs the received values, and outputs the result. As shown in FIG. 6b, only the output of an AND gate corresponding to macro block 4 is a "high" logic level, and the remaining outputs are a "low" logic level.

The first OR gate 530 receives and ORs the outputs of AND gates 520, and if any input signals are a "high ('1')" logic level as this case, outputs a "high" logic level signal.

The second OR gate 540 receives and ORs the output ("high") of the first OR gate 530 and the current packet change signal, and outputs a value which is used to determine whether the packet of a macro block immediately above the current macro block is the same as the packet of the current macro block. As shown in FIG. 6b, the output of the second OR gate 540 is a "high ('1')" logic level, which indicates that the packet of the macro block immediately above the current macro block is different from the packet of the current macro block (macro block 3 of the lower slice).

The output signal of the second OR gate 540 is output to the outside at the second clock (mbh_set_tmp2) which is delayed for one clock from the clock at which the current packet change signal is input.

The third OR gate 550 receives and ORs the output ("high") of the second OR gate 540 and the packet change register value corresponding to the current macro block, that is, the packet change signal value of the above macro block. The output of the third OR gate 550 is a value for determining whether or not the packet of a macro block immediately above and to the left of the current macro block is the same as the packet of the current macro block. As shown in FIG. 6b, the output of the third OR gate 550 is a "high ('1')" logic level and indicates that the packet of the current macro block (macro block 3 of the lower slice) is different from the packet of the macro block (macro block 2 of the upper slice) immediately above and to the left of the current macro block.

The output signal of the third OR gate 550 is output to the outside at a clock (mbh_set_tmp3) which is delayed for one clock from the clock at which the current packet change signal is input.

FIG. 6c is a table which shows the operation for predicting macro block 4 of the lower slice 620.

Since there is no packet change in macro block 4, the current packet change signal is input as a "low" logic level. At the first clock (mbh_set_tmp), at which the current packet change signal of the current macro block is input, the current packet change signal of the current macro block is not stored in the packet change register, and the packet change signal ('1') of macro block 4 of the upper slice 610 is still stored in the packet changer register 4. Also in the packet change registers 5 through 21 after packet change register 4, packet change signals of the macro blocks of the upper slice are stored. Therefore, the value stored in the packet register unit 510 is '00001000000000000000000' starting at packet change register 0 in increasing order.

Since prediction for macro block 4 is currently performed, the selection signal becomes '11110111111111111111111'.

Each AND gate 520 receives a value stored in a register of the packet change register unit 510 and a corresponding bit of the selection signal, ANDs the received values, and outputs the result. As shown in FIG. 6c, all the outputs of the AND gates 520 are a "low" logic level.

The first OR gate 530 receives and ORs the outputs of AND gates 520. Because the outputs of all AND gates 520 are a "low" logic level the output of the first OR gate 530 is also a "low" logic level.

The second OR gate 540 receives and ORs the output ("low") of the first OR gate 530 and the current packet change signal ("low"), and outputs a value which is used to determine whether the packet of a macro block immediately above the current macro block is the same as the packet of the current macro block. As shown in FIG. 6c, the output of the second OR gate 540 is a "low ('0')" logic level, which indicates that the packet of the macro block immediately above the current macro block is the same as the packet of the current macro block (macro block 4 of the lower slice).

The output signal of the second OR gate 540 is output to the outside at the second clock (mbh_set_tmp2) which is delayed for one clock from the clock at which the current packet change signal is input.

The third OR gate 550 receives and ORs the output ("low") of the second OR gate 540 and the packet change register value corresponding to the current macro block, that is, the packet change signal value ("high") of macro block 4 of the upper slice 610. The output of the third OR gate 550 is a value for determining whether or not the packet of a macro block immediately above and to the left of the current macro block is the same as the packet of the current macro block. As shown in FIG. 6c, the output of the third OR gate 550 is a "high ('1')" logic level and indicates that the packet of the current macro block (macro block 4 of the lower slice) is different from the packet of the macro block (macro block 3 of the upper slice) immediately above and to the left of the current macro block.

The output signal of the third OR gate 550 is output to the outside at the second clock (mbh_set_tmp2) which is delayed for one clock from the clock at which the current packet change signal is input.

FIG. 6d is a table which shows the operation for predicting macro block 5 of the lower since 620.

Since there is a packet change in macro block 5, the current packet change signal is input as a "high" logic level. At the first clock (mbh_set_tmp), at which the current packet change signal of the current macro block is input, the current packet change signal of the current macro block is not stored in the packet change register, and the packet change signal ('0') of macro block 5 of the upper slice 610 is still stored in the packet changer register 5 Also in the packet change registers 6 through 21 after packet change register 5, packet change signals of the macro blocks of the upper slice are stored. Therefore, the value stored in the packet register unit 510 is '0000100000000000000000' starting at packet change register 0 in increasing order.

Since prediction for macro block 5 is currently performed, the selection signal becomes '1111101111111111111111'.

Each AND gate 520 receives a value stored in a register of the packet change register unit 510 and a corresponding bit of the selection signal, ANDs the received values, and outputs the result. As shown in FIG. 6d, only the output of an AND gate corresponding to macro block 4 is a "high" logic level, and the remaining outputs are a "low" logic level.

The first OR gate 530 receives and ORs the outputs of AND gates 520, and if any input signals are a "high ('1')" logic level as this case, outputs a "high" logic level signal.

The second OR gate 540 receives and ORs the output ("high") of the first OR gate 530 and the current packet change signal ("high"), and outputs a value which is used to determine whether the packet of a macro block immediately above the current macro block is the same as the packet of the current macro block. As shown in FIG. 6d, the output of the second OR gate 540 is a "high ('1')" logic level, which indicates that the packet of the macro block immediately above the current macro block is the same as the packet of the current macro block (macro block 5 of the lower slice).

The output signal of the second OR gate 540 is output to the outside at the second clock (mbh_set_tmp2) which is delayed for one clock from the clock at which the current packet change signal is input.

The third OR gate 550 receives and ORs the output ("high") of the second OR gate 540 and the packet change register value corresponding to the current macro block, that is, the packet change signal value ("low") of the packet change signal value of the above macro block. The output of the third OR gate 550 is a value for determining whether or not the packet of a macro block immediately above and to the left of the current macro block is the same as the packet of the current macro block. As shown in FIG. 6d, the output of the third OR gate 550 is a "high ('1')" logic level and indicates that the packet of the current macro block (macro block 5 of the lower slice) is different from the packet of the macro block (macro block 4 of the upper slice) immediately above and to the left of the current macro block.

The output signal of the third OR gate 550 is output to the outside at the second clock (mbh_set_tmp2) which is delayed for one clock from the clock at which the current packet change signal is input.

The packet change detection logic using the method described above reduces a lot of circuit areas compared to a method using 22 9-bit registers for storing packet numbers in each macro block.

Figure 7:
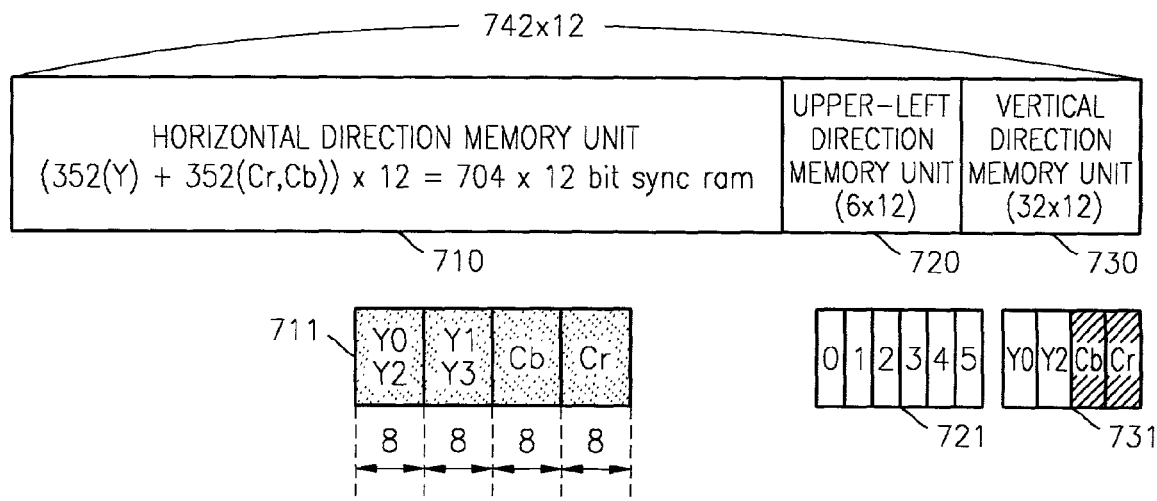
FIG. 7 is a diagram of a prediction memory of the present invention.

FIG. 7 is a block diagram of a prediction memory in the prediction reference value providing unit 420 of the present invention.

The prediction memory is formed with a horizontal direction memory unit 710, an upper-left direction memory unit 720, and a vertical direction memory unit 730.

The horizontal direction memory unit 710 has a storage area which can store the horizontal DCT component of a color difference signal block of a slice forming a scene, and the horizontal DCT component of a brightness signal block of an upper brightness signal block or a lower brightness signal block forming a slice One slice forming a CIF scene is formed with 22 macro blocks. Each macro block is formed with four 8×8 brightness signal (Y) blocks and two 8×8 color difference signal (Cb, Cr) blocks. Among the blocks, the brightness signal blocks are formed with the upper brightness signal blocks (803, 804, 805, and 806) which are formed with blocks 0 and 1, and the lower brightness signal blocks (801, 802, 807, 808, 809, and 810) which are formed with blocks 2 and 3. The horizontal direction memory unit 710 has storage areas which can store the DCT component of the first column of the upper brightness signal blocks or the lower brightness signal blocks, and storage areas which can store the DCT component of the first column of the color difference signal blocks for the color difference signal (Cb, Cr) blocks.

That is, the horizontal direction memory unit 710 has storage areas for 352 brightness signals, that is, 8 (the number of DCT components in one column of one block)× 22 (the total number of macro blocks of one slice)×2 (the number of the upper brightness blocks or the lower brightness blocks of a macro block)=352 brightness signals. The horizontal direction memory unit 710 also has storage areas for 352 color difference signals, that is, 8 (the number of DCT components in one column of one block)×22 (the total number of macro blocks of one slice)×2 (the Cb signal block, the Cr signal block)=352 color difference signals. Since 12 bits are assigned for one DCT component, total 704×12 storage areas is assigned to the horizontal direction memory unit 710.

The vertical direction memory unit 730 has storage areas which can store the vertical DCT component representing one row forming one slice, and therefore has 32 storage areas, that is, 8 (the number of DCT component of one row of one block)×4 (the upper brightness signal block, the lower brightness signal block, the Cb signal block, the Cr signal block)=32 storage areas.

The upper-left direction memory unit 730 has storage areas which can store the DC component of a block immediately above and to the left of the current block for which prediction is performing. In the present invention, the upper-left direction memory unit 730 has at least 6 storage areas.

In the prior arts, the DCT component of a block immediately above the current block is stored in the horizontal direction memory unit, and whenever prediction of the current block is performed, the DCT component of the current block is stored in the same location as the DCT component of the block immediately above the current block is stored, replacing the DCT component of the block immediately above the current block. Accordingly, in order to refer to the DC component of the block immediately above and to the left of the current block, a separate memory having the same size of storage areas as the horizontal direction memory unit should be prepared.

Figure 8:
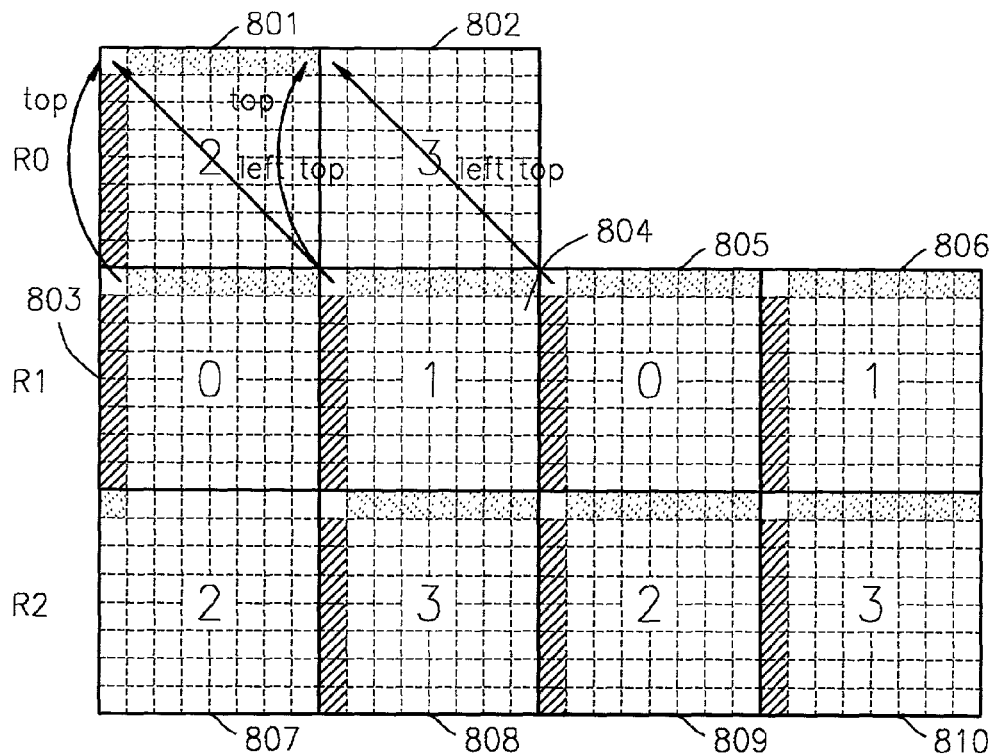
FIG. 8 is a diagram for showing the location of a brightness signal on a scene.

That is, since prediction is separately performed for each macro block when prediction of a slice is performed, in order to predict a slice formed with rows R1 and R2 in FIG. 8, prediction should be performed in order of block 0 803, block 1 804, block 2 807, block 3 808, block 0 805, block 1 806, block 2 809, and finally block 3 810. However, when prediction of block 3 808 is performed, the DCT component of block 2 807 to the left of block 3 808 is stored replacing the DCT component of block 0 803 immediately above and to the left of block 0 808. Therefore, in order to refer to the DCT component of block 0, an additional separate memory space should be prepared.

Accordingly, in processing a macro block in the prior arts, two additional areas are needed. That is, in order to process block 0 803 and block 1 804 of row R1, an area for storing a inverse quantized coefficient value of row R0 in the upper slice is needed, and in order to process block 2 807 and block 3 808 of row R2, an area for storing a inverse quantized coefficient value of block 0 803 and block 1 804 of the current macro block is needed.

However, in the present invention, the DC component of a block above the current block is read from the horizontal direction memory unit 710, and then stored in the upper-left direction memory unit 720 so that the DC component of the block immediately above and to the left of the current block is referred to when prediction of the next block is performed. As a result, the size of the memory used in prediction is greatly reduced.

FIG. 9 is a table to store the DC component of a block immediately above the current block into the upper-left direction memory unit 720.

'Block index' indicates the block number shown in FIG. 8, and block numbers 4 and 5 are assigned to the color difference signal blocks, that is, to the Cb signal block and the Cr signal block, respectively.

'Location in upper-left memory for storing upper DC component' corresponds to the number of a part 721 which represents the storage area of the upper-left direction memory of FIG. 7. When prediction of block 0 803 is performed in FIG. 8, the DCT component of block 2 801 is read from the horizontal direction memory unit 710, prediction is performed, and then the DC component of block 2 801 is stored in area 0 of the upper-left direction memory unit 721. For the remaining blocks, in the same method as shown in the table, prediction of the current block is performed while the fetched DC component of the block above the current block is stored in the upper-left direction memory unit 721.

'Location referring to upper-left DC component' is a number indicating from which area of the upper-left direction memory unit 721 the DC component of the block immediately above and to the left of the current block, the DC component which should be referred to in order to perform prediction of the current block, is read. For example, if prediction of block 1 804 is currently performed, the DC component of block 2 801, which is referred to as a block above the current block when prediction of block 0 803 is performed, is needed. Since the DC component is stored in area 0 of the upper-left direction memory unit 721 when prediction of block 0 803 is performed, the DC component of the upper-left block can be read from area 0 of the upper-left direction memory unit 721.

Figure 10B:
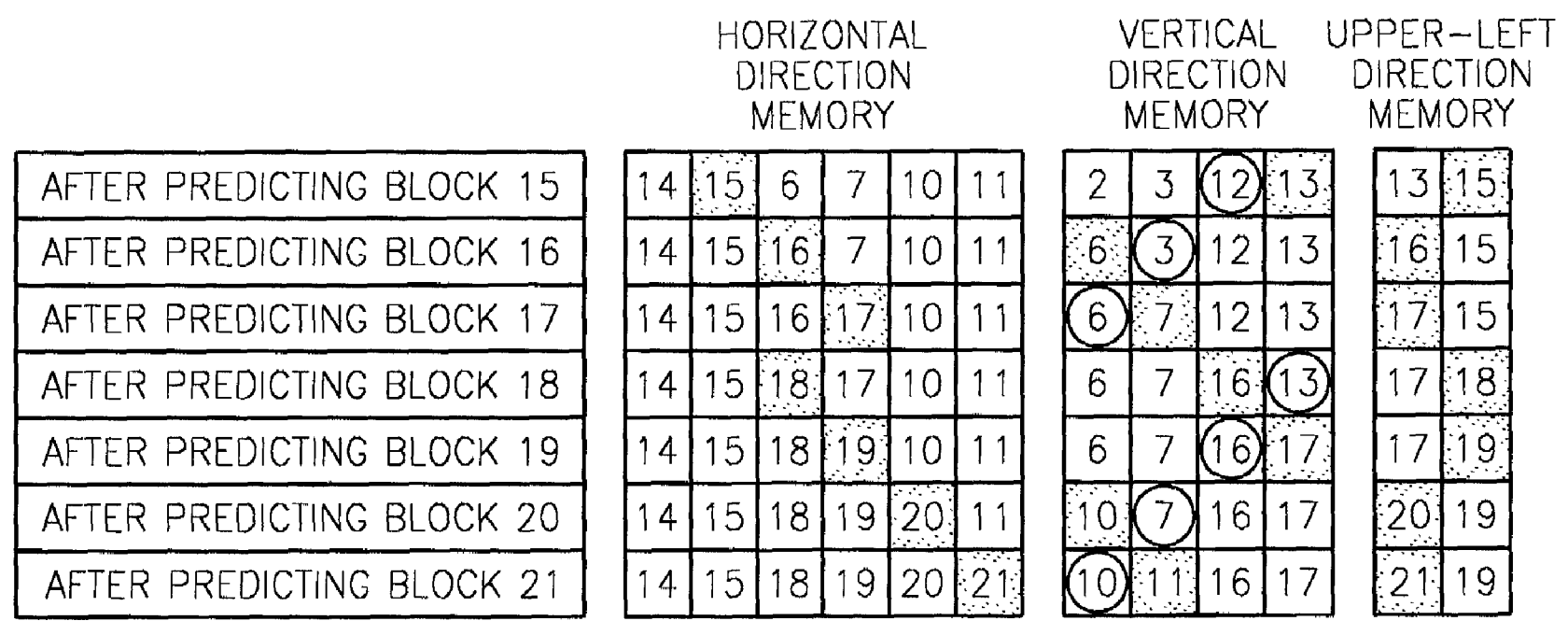

This will be explained in detail referring to FIGS. 10*a* and 10*b*. Each of FIGS. 10*a* and 10*b* shows the arrangement in a scene formed with two slices, each of which is formed with 3 macro blocks. For convenience of explanation, only brightness signal blocks are shown and color difference signal blocks are not shown.

Before performing prediction on block 16, in the horizontal direction memory unit 710, the DCT components of a block (block 6) immediately above block 16 and blocks (blocks 7, 10, and 11) to the right of block 6 are stored, and the DCT components of blocks 14 and 15 of which predictions were performed before prediction of block 16 are stored.

If the prediction on block 16 begins, a memory control unit (not shown) stores the DC component of upper block 6 in location 0 of the upper-left direction memory unit (721), stores the vertical DCT component of block 16 in a location of the vertical direction memory unit 731 in a way replacing the vertical DCT component of block 13 that is a block of the same column as block 16, and stores the horizontal DCT component of current block 16 in a location of the horizontal direction memory unit 711 in a way replacing the horizontal DCT component of block 6 that is an upper block of the block 16, the current block.

Likewise, if the prediction of block 17 begins, a memory control unit (not shown) stores the DC component of upper block 7 in location 0 of the upper-left direction memory unit (721), stores the vertical DCT component of block 17 in a location of the vertical direction memory unit 731 in a way replacing the vertical DCT component of block 16 that is a block of the same column as block 17, and stores the horizontal DCT component of current block 17 in a location of the horizontal direction memory unit 711 in a way replacing the horizontal DCT component of block 7 that is an upper block of the block 17, the current block.

For the remaining blocks, the DCT components are stored as shown in FIG. 10*b*.

Figure 11:
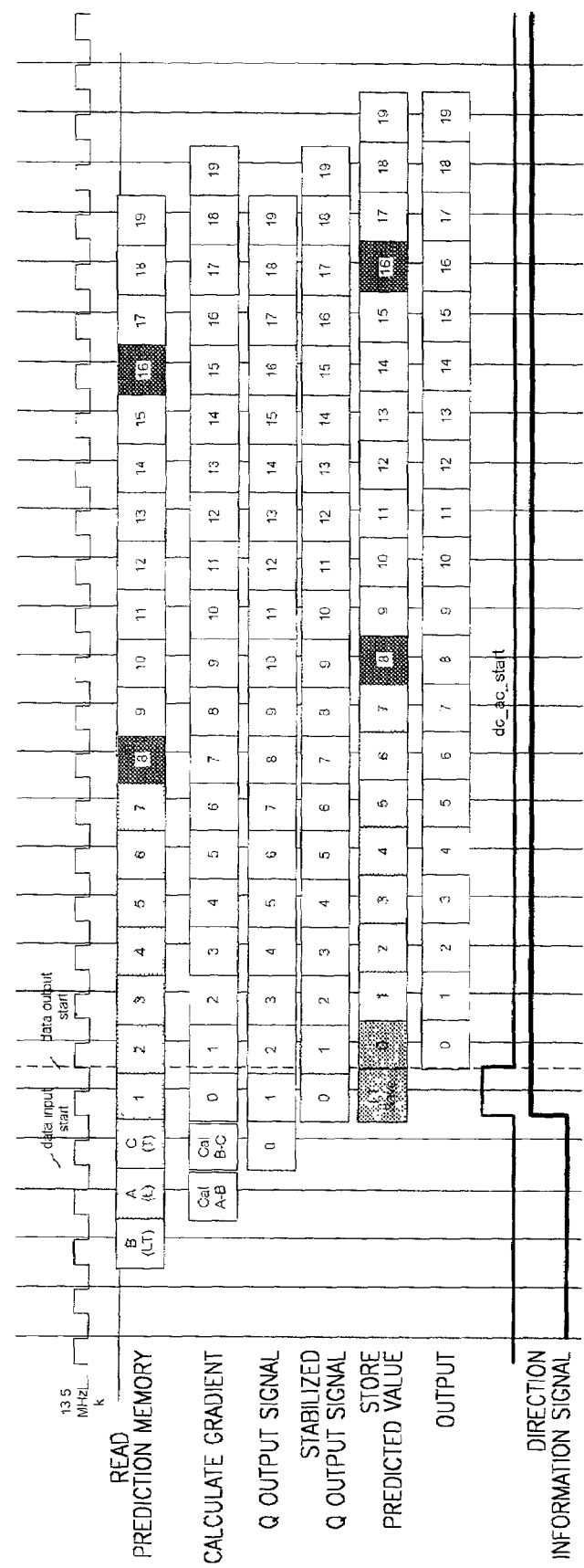
FIG. 11 is a diagram of a data flow with respect to time according to the present invention.

FIG. 11 is a diagram of a data flow with respect to coding time.

First, as shown in 'read prediction memory' part, the DC component (B) of an upper left-hand block of the current block is read from the upper-left direction memory unit 720, and the DC component (A) of a left-hand block of the current block is read from the vertical direction memory unit 730. As shown in 'calculate gradient' part, the gradient between the upper left-hand block of the current block and the upper left-hand block of the current block is calculated (Cal A−B).

Next, the DC component (C) of an upper block of the current block is read from the horizontal direction memory unit 710, and, as shown in 'gradient slope' part, the gradient between the upper left-hand block of the current block and the upper block of the current block is calculated (Cal B−C)

After the gradient calculations, a direction having a smaller gradient is determined as a prediction direction according to the following procedure:

if $(|FA[0][0] - FB[0][0]| < |FB[0][0] - FC[0][0]|)$ $FB[0][0] = FC[0][0]$ else $FP[0][0] = FA[0][0]$ The step for determining the prediction direction should begin at least 2 clocks before the current block value is input.

In 'read prediction memory' part, data which is read at each clock indicates the DCT components forming a block Data 1 through 7 indicating the horizontal AC component of the block are read from the horizontal direction memory unit 710, and data 8 and 16 indicating the vertical AC component of the block are read from the vertical direction memory unit 730.

"Q output signal' part indicates a signal output from the quantizing unit 102 in a coding mode and indicates that the quantized DCT component of a block for which prediction is currently performed is input. 'Stabilized Q output signal' part indicates an output signal which is delayed for one clock using flip-flops in order to stabilize the quantized DCT component 'Store predicted value' part is a part which stores data needed in the prediction memory after performing prediction. 'LT save' part is a part which stores the DC value (C) of a block immediately above the current block which is read in 'read prediction memory' part, in the upper-left direction memory. '0' part is a part which inverse quantizes the quantized DC component of the current block which is input at 'Q output signal' or 'stabilized Q output signal', and stores the result in the horizontal direction memory unit 710 and the vertical direction memory unit 730. Parts '0' through '7' are parts which inverse quantize the quantized horizontal AC component of the current block and store the result in the horizontal direction memory unit 710. Parts '8' and '16' and parts '24', '32', '40', '48' and '56' (not shown) are parts which inverse quantize the quantized vertical AC component of the current block and store the result in the vertical direction memory unit 730

'dc_ac_start' signal becomes a "high" logic level if the DCT component of the current block being input is a DC component, and becomes a "low" logic level if the DCT component is an AC component.

'Direction information signal' part indicates a prediction direction. For example, when prediction of the current block is performed, if the prediction is performed based on the DCT component of a block to the left of the current block, 'direction information signal' part is a "high" logic level, and if the prediction is performed based on the DCT component of a block immediately above the current block, 'direction information signal' part is a "low" logic level.

Figure 12:
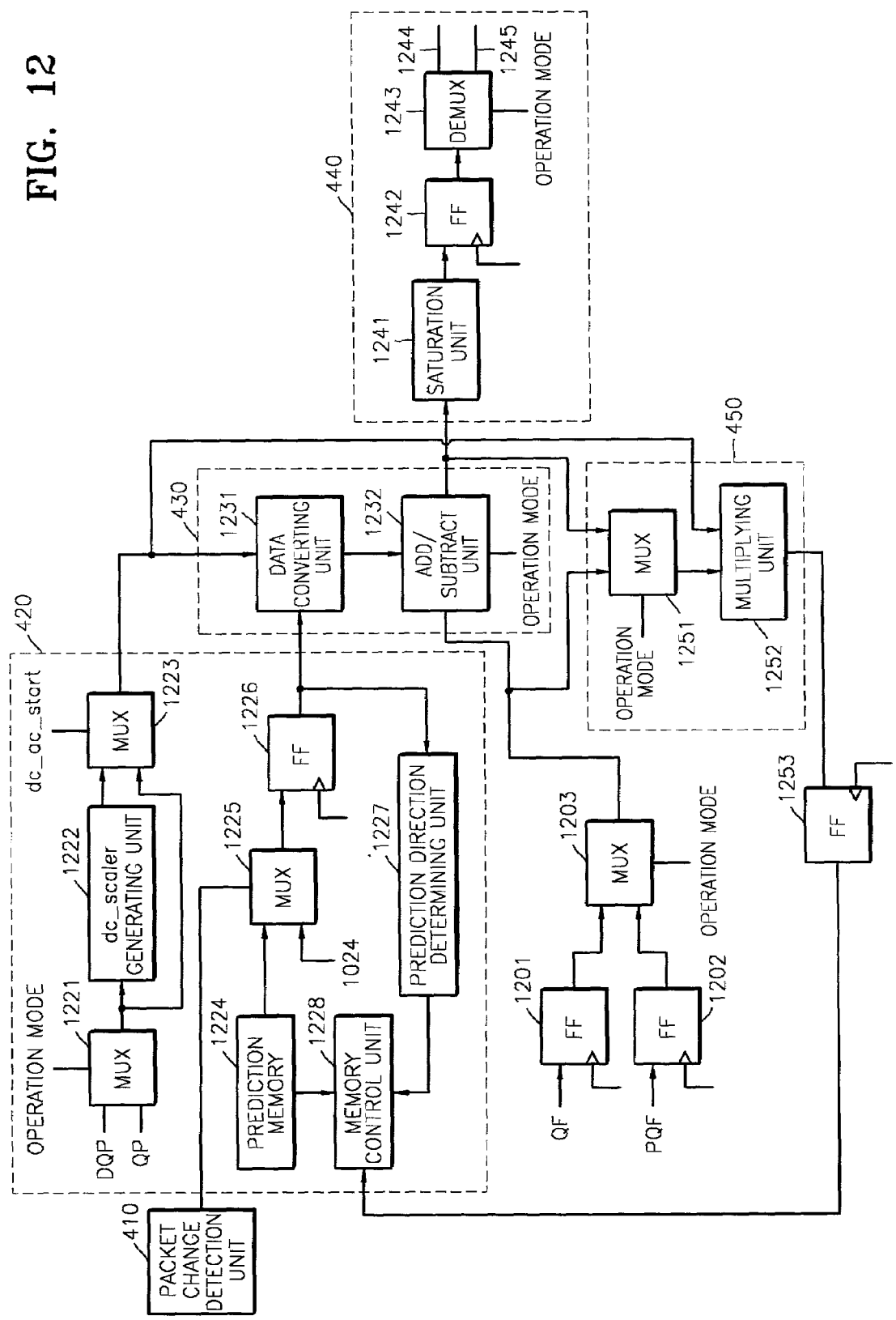
FIG. 12 is a block diagram of a preferred embodiment of the present invention.

FIG. 12 is a block diagram of a preferred embodiment of the present invention.

First, the packet change detection unit 410 has the same structure as shown in FIG. 5. The packet change detection unit 410 determines whether or not the packet of a current macro block for which prediction is currently performed is the same as the packet of a macro block to the left of the current macro block, a macro block immediately above and to the left of the current macro block, or a macro block immediately above the current macro block, and provides the result to the prediction reference value providing unit 420.

The multiplexer (MUX) 1225 of the prediction reference value providing unit 420 receives the output of the packet change detection unit 410, and if the packet of anyone of adjacent macro blocks is different from the packet of the current macro block, outputs a predetermined reference value as a prediction reference value. Preferably, the predetermined reference value is 1024.

If the packet of all adjacent macro blocks is the same as the packet of the current macro block, MUX 1225 receives the DC components of the block immediately above and to the left of the current block, the block to the left of the current block, and the block immediately above the current block from the upper-left direction memory unit 720, the vertical direction memory unit 730, and the horizontal direction memory unit 710, respectively, and provides the DC components through the flip-flop 1226 to the prediction direction determining unit 1227 at each clock.

As explained in FIG. 11, the prediction direction determining unit 1227 obtains gradients of each direction, determines a smaller gradient direction as the prediction direction, and outputs a direction information signal as shown in FIG. 11. The direction determined here is also used as a factor which determines a scanning method in a coding apparatus and a decoding apparatus.

The memory control unit 1228 receives the direction information signal from the prediction direction determining unit 1227, and control the prediction memory 1224 to output data matching the prediction direction to MUX 1225. For example, if the prediction direction is determined to be based on the DCT component of a block to the left of the current block, the memory control unit 1228 controls the prediction memory 1224 to output the DCT component of the block to the left of the current block.

Also, the memory control unit 1228 receives the inverse quantized DCT component of the current block from the flip-flop 1253 and stores the DCT component in the prediction memory 1224. The memory control unit 1228 also controls the prediction memory 1224 to output DC components of the block immediately above and to the left of the current block, the block to the left of the current block, and the block immediately above the current block at least 2 clocks before prediction of another new block begins.

The DCT components output according to the determined prediction direction are provided as a prediction reference value through the flip-flop 1226 to the data converting unit 1231 of the prediction calculation unit 430.

Also to the data converting unit 1231, a quantization value is input through MUX 1223. In order to output the quantization value, MUX 1221 receives DQP (a decoded quantization value) and QP (a quantization value), and outputs DQP or QP depending on whether the operation mode is a decoding mode or a coding mode.

The output of MUX 1221 is input to both the dc_scaler generating unit 1222 and MUX 1223. Using QP or DQP, dc_scaler that is the quantization value of a DC component is generated as described in MPEG-4 DIS.

If dc_ac_start signal indicates DC, MUX 1223 provides the quantization value of DC component output from the dc_scaler generating unit 1222 to the data converting unit 1231, and if dc_ac_start signal indicates AC, MUX 1223 provides the quantization value of the AC component output from MUX 1221 to the data converting unit 1231.

The data converting unit 1231 divides the prediction reference value received from the flip-flop 1226 by the quantization value received from MUX 1223, rounds the result to the nearest whole number, and outputs the quantized prediction reference value to the add/subtract unit 1232.

The add/subtract unit 1232 of the prediction calculation unit 430 receives the quantized prediction reference value from the data converting unit 1231, and if the operation mode is a coding mode, receives the output value of the quantizing unit 102 through MUX 1203, and if the operation mode is a decoding mode, receives the output value of the quantizing coefficient buffer 202 through MUX 1203.

More specifically, when prediction coding of a DC component is performed, the add/subtract unit 1232 performs subtraction of QFX[0][0]−Fp[0][0]//dc_scaler, and outputs PQFX[0][0]. When prediction decoding of a DC component is performed, the add/subtract unit 1232 performs addition of PQFX[0][0]+Fp[0][0]//dc_scaler, and outputs QFX[0][0].

Here, Fp[0][0]//dc_scaler is the quantized DC component which is output from the data converting unit 1221, and the quantized DC component of a block which is a reference of prediction. Fp[0][0] is a value stored in the prediction memory 1224 or a predetermined reference value, and dc_scaler is a value generated by the dc_scaler generating unit 1222.

Also, QFX[0][0] is the quantized DC component of the current block, and PQFX[0][0] is a prediction error of prediction calculation.

Figure 1:
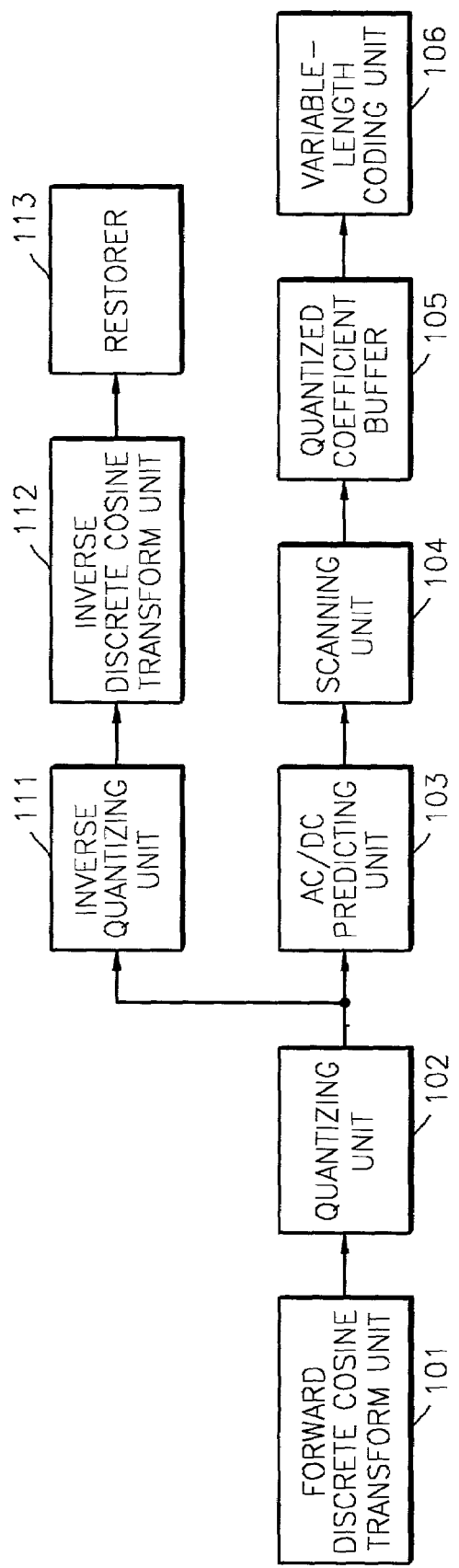
FIG. 1 is a block diagram of a data flow for MPEG-4 coding.
Figure 2:
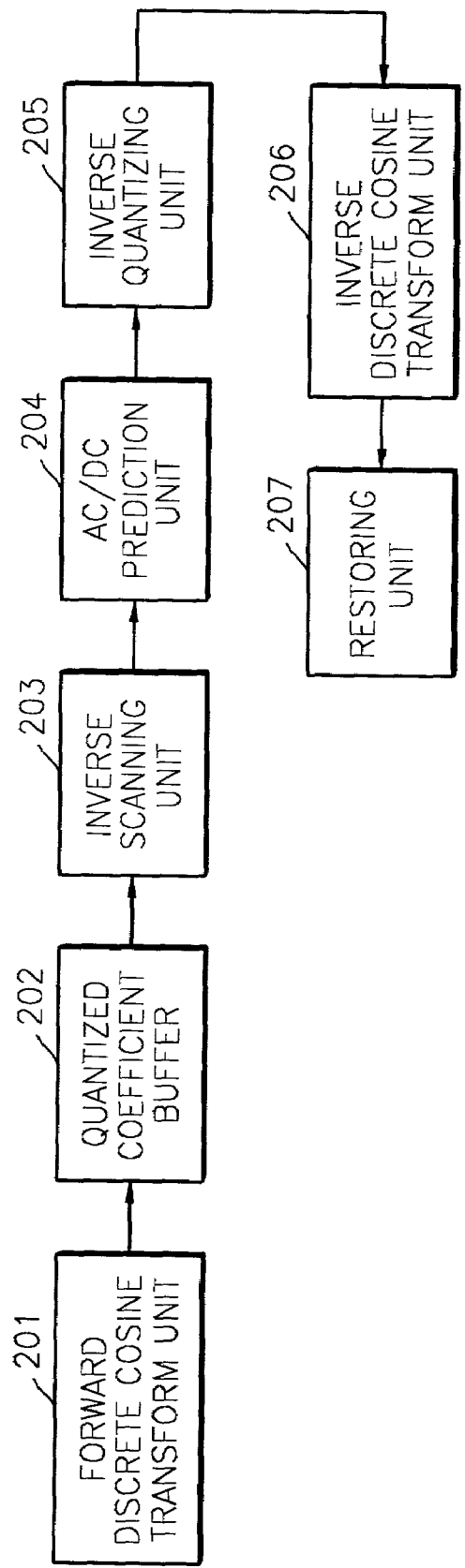
FIG. 2 is a block diagram of a data flow for MPEG-4 decoding.
Figure 3:
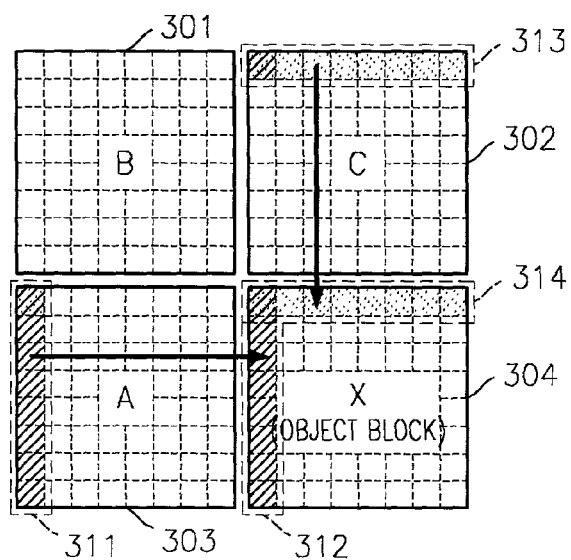
FIG. 3 is a diagram for explaining prediction coding of an AC component and a DC component in MPEG-4.

Likewise, for an AC component, the add/subtract unit 1244 performs addition of QFX[0][i]=PQFX[0][i]+(QFA[0][i]*QPA)//QPX in a decoding mode, and performs subtraction of PQFX[0][i]=QFX[0][i]−(QFA[0][i]*QPA)//QPX in a coding mode. (When prediction is performed based on block A of the left-hand part of FIG. 3)

The value output from the add/subtract unit 1232 is sent to the saturation unit 1241 of the output unit 440, and modified in the saturation unit 1241 so that the output is a value between [−2048, 2047] inclusive. The saturation unit 1241 is defined in MPEG-4.

The output value of the saturation unit 1241 is sent along the flip-flop 1232 to DEMUX 1243, and then sent depending on an operation mode. That is, the value is sent to the scanning unit 104 in a coding mode, or is sent to the inverse quantizing unit 205 in a decoding mode.

Meanwhile, since both of a signal which is input to the add/subtract unit 1232 in a coding mode, and a signal which is output from the add/subtract unit 1232 in a decoding mode are a quantized DCT component, but a signal which is stored in the prediction memory is an inverse quantized DCT component, inverse quantization is needed to store the DCT value of the current block in the prediction memory.

MUX 1251 of the inverse quantizing unit 450 provides the input (QFX) of the add/subtract unit 1232 to the multiplying unit 1252 in a coding mode, and provides the output (QFX) of the add/subtract unit 1232 to the multiplying unit 1252 in a decoding mode The multiplying unit 1252 receives the quantization value from MUX 1223, multiplies the quantization value by the output of MUX 1251 to inverse quantize the quantized DCT component of the current block. The inverse quantized DCT component of the current block is sent through the flip-flop 1253 and stored in the prediction memory 1228.

Figure 13:
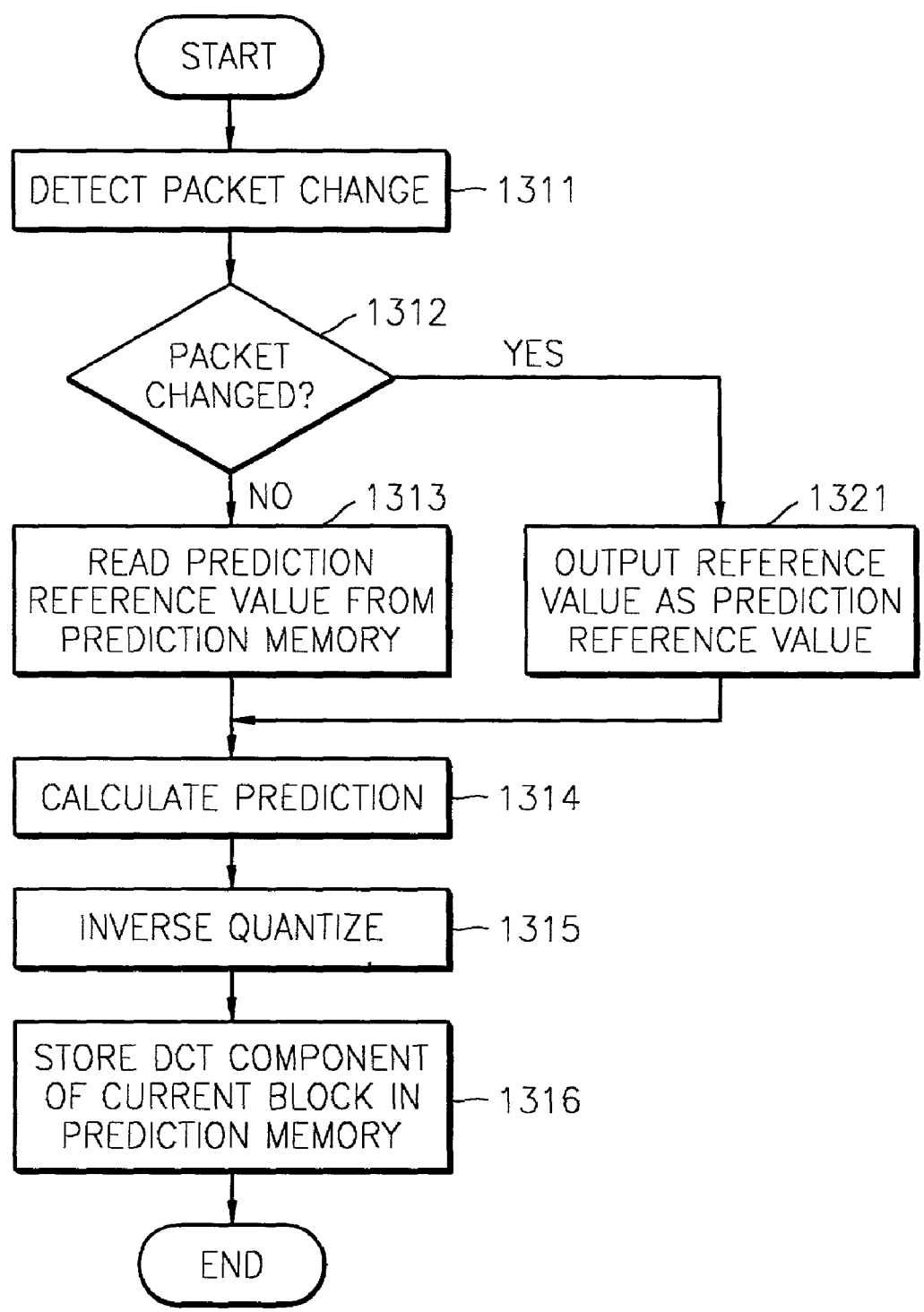
FIG. 13 is a flowchart of a method for performing prediction of the present invention.

FIG. 13 is a flowchart of a method for performing prediction of the present invention.

First, based on the current packet change signal which indicates whether or not the packet of the current macro block changed, the packet change detection unit 410 determines whether or not the packet of the current macro block is the same as the packet of a macro block to the left of the current macro block, a macro block immediately above and to the left of the current macro block, or a macro block immediately above the current macro block, and provides the result to the prediction reference value providing unit 420 in step 1311.

Figure 14:
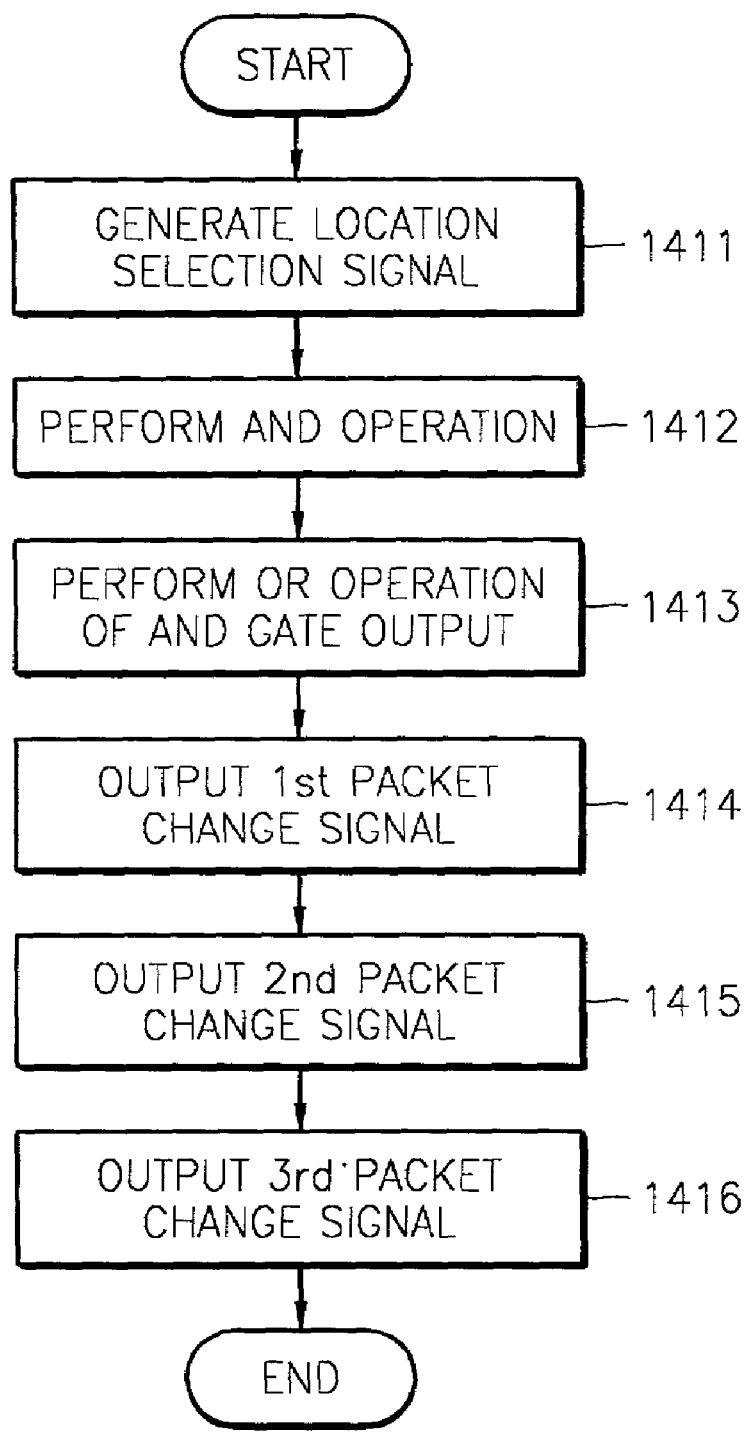
FIG. 14 is a flowchart of a method for detecting a packet change of the present invention.

The step for determining whether or not the packet of the current macro block is the same as the packet of the macro block to the left of the current macro block, the macro block immediately above and to the left of the current macro block, or the macro block immediately above the current macro block is shown in FIG. 14.

First, the decoder 560 of the packet change detection unit 410 generates a selection signal indicating the location value of X axis on the scene of the current macro block in step 1411.

The AND gate unit 520 receives and ANDs the selection signal and the value stored in the packet change register unit 510 in step 1412. The first OR gate 530 receives and ORs the outputs of the AND gate unit 520 in step 1413.

The flip-flop 571 receives the current packet change signal and outputs, one clock after, the first packet change signal that indicates whether or not the packet of the macro block to the left of the current macro block is the same as the packet of the current macro block in step 1414.

The second OR gate 540 receives and ORs the output of the first OR gate 530 and the current packet change signal 573, and generates the second packet change signal that indicates whether or not the packet of the macro block immediately above the current macro block is the same as the packet of the current macro block in step 1415.

The third OR gate 550 receives and ORs the output of the second OR gate 540 and the value stored in the register 511 corresponding to the location on X axis of the scene of the current macro block, and outputs the third packet change signal that indicates whether or not the packet of the macro block immediately above and to the left of the current macro block is the same as the packet of the current macro block in step 1416.

The prediction reference value providing unit 420 determines the received signal in step 1312. If the packet of the macro block to the left of the current macro block, the macro block immediately above and to the left of the current block, or the macro block immediately above the current block is different from the packet of the current macro block, the prediction reference value providing unit 420 outputs a predetermined reference value in step 1321. Preferably, the predetermined reference value is 1024

If the packet of the macro block to the left of the current macro block, the macro block immediately above and to the left of the current block, or the macro block immediately above the current block is the same as the packet of the current macro block, the prediction reference value providing unit 420 reads the prediction reference value from the prediction memory 1224 in step 1313.

Figure 15:
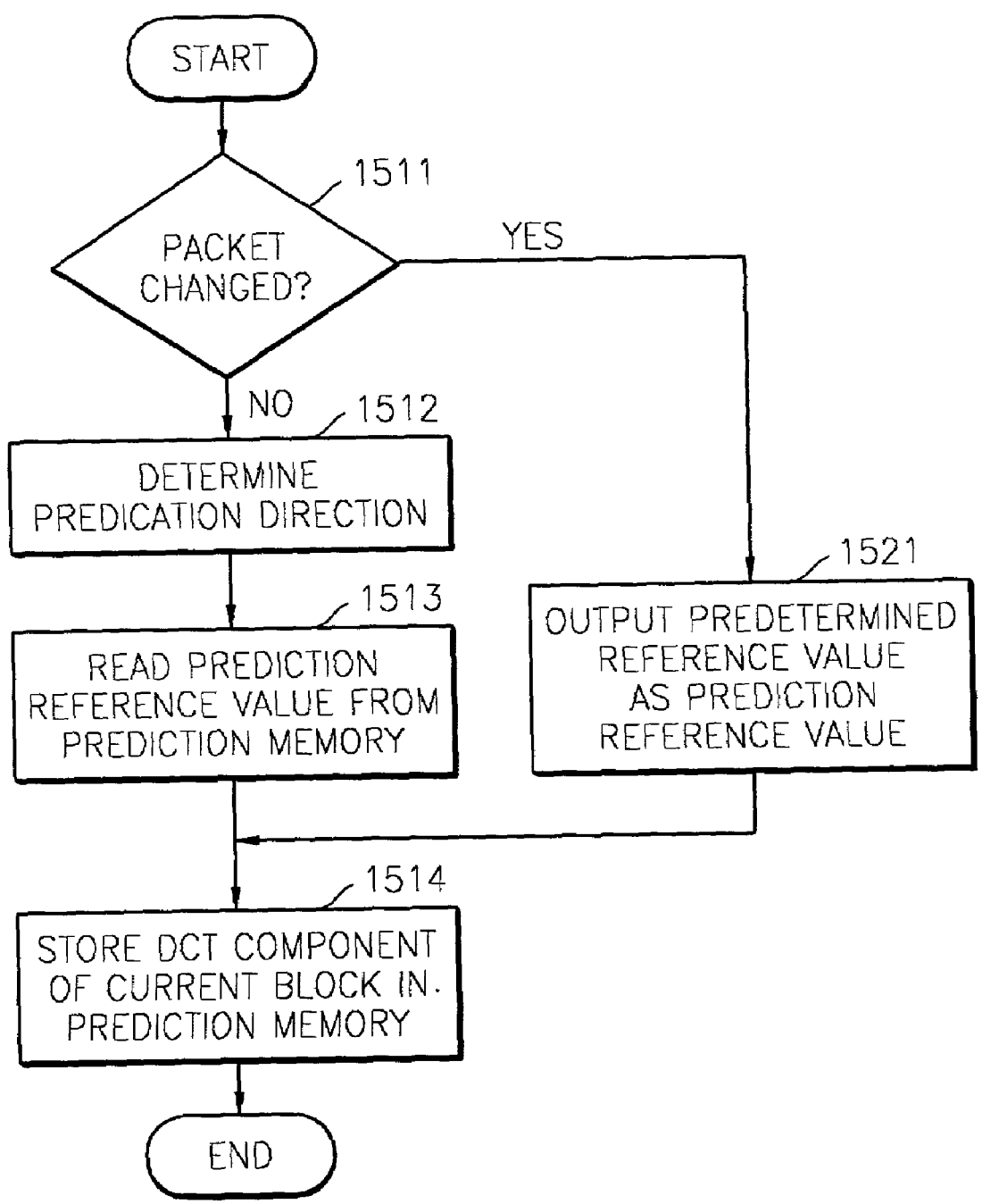
FIG. 15 is a flowchart of a method for controlling a prediction memory of the present invention.

The step for outputting the prediction reference value by controlling the prediction memory 1224 is shown in FIG. 15.

As in FIG. 13, it is determined whether or not the packet changed in step 1511. If the packet changed, a predetermined reference value is output as the prediction reference value in step 1521. If the packet did not change, the prediction direction determining unit 1227 of the prediction reference value providing unit 420 reads the DC component of the block to the left of the current block from the vertical direction memory of the prediction memory, the DC component of the block immediately above the current block from the horizontal direction memory, the DC component of the block immediately above and to the left of the current block. Then, the prediction direction determining unit 1227 determines a smaller gradient direction as the prediction direction in step 1512, and outputs a direction information signal If according to the determined prediction direction, prediction is based on the left-hand block of the current block, the memory control unit 1228 outputs the DCT component of the upper block of the current block which is stored in the vertical direction memory unit 730 as the reference prediction value. If according to the determined prediction direction, prediction is based on the upper block of the current block, the memory control unit 1228 outputs the DCT component of the upper block of the current block which is stored in the horizontal direction memory unit 710 as the reference prediction value in step 1513.

The prediction calculation unit receives the prediction reference value provided by the prediction reference value providing unit 420, and converts the value into data having an appropriate shape by quantizing the value. Then, if the signal input to the prediction apparatus and the operation mode indicate a coding mode, the prediction calculation unit performs subtraction and if the signal and the operation mode indicate a decoding mode, the prediction calculation unit performs addition. By doing so, the prediction calculation unit performs prediction and outputs the result in step 1314.

Since a signal which is input to or output from the add/subtract unit 1282 is a quantized signal, inverse quantization is needed in order to store the DCT component of the current block in the prediction memory 1224. For inverse quantization, if the operation mode is a coding mode, a signal which is input to the add/subtract unit 1232 is multiplied by a quantization value, and if the operation mode is a decoding mode, a signal which is output from the add/subtract unit 1232 is multiplied by the quantization value in step 1315.

The inverse quantized DCT component of the current block is stored in the prediction memory 1224 by the memory control unit 1228 in step 1316. The memory control unit 1228 stores the DC component of the block immediately above the current block in the upper-left direction memory unit 720, the horizontal DCT component of the current block in the horizontal direction memory unit 710, and the vertical DCT component of the current block in the vertical direction memory unit 730. By doing so, the memory control unit 1228 stores the DCT component of the current block in the prediction memory 1224.

According to the apparatus for prediction of the present invention, the size of a part for detecting packet changes and the size of a prediction memory for storing data which is a reference of prediction can be greatly reduced and therefore the apparatus is appropriate to a small-sized low-power device such as a mobile phone. The apparatus for prediction according to the present invention can be used both for a coding device and a decoding device.

What is claimed is:

1. An apparatus for predicting a Discrete Cosine Transform (DCT) component of an image signal in an apparatus for prediction coding or decoding an image signal, the apparatus for predicting a DCT component comprising:

a packet change detection unit which determines whether or not blocks used to determine a prediction direction for a current block for which prediction is currently performed is included in a same packet to which the current block belongs;

a prediction reference value providing unit which provides a prediction reference value used in prediction according to the result of determination by the packet change detection unit; and a prediction calculation unit which outputs a predictive coded value or a predictive decoded value using the prediction reference value provided by the prediction reference value providing unit and the DCT component of the current block according to an operation mode.

2. The apparatus of claim 1, wherein the prediction calculation unit performs subtraction of the DCT component of the current block and the prediction reference value if the operation mode is a coding mode, and performs addition of the DCT component of the current block and the prediction reference value if the operation mode is a decoding mode.

3. The apparatus of any one of claims 1, wherein the apparatus for predicting a DCT component further comprises an inverse quantizing unit which inverse quantizes the DCT component of the current block if the operation mode is a coding mode, and inverse quantizes the prediction decoded value which is output from the prediction calculation unit if the operation mode is a decoding mode, and provides the inverse quantized value to the prediction reference value providing unit.

4. The apparatus of any one of claim 2, wherein the apparatus for predicting a DCT component further comprises an (inverse) quantizing unit which inverse quantizes the DCT component of the current block if the operation mode is a coding mode, and inverse quantizes the prediction decoded value which is output from the prediction calculation unit if the operation mode is a decoding mode, and provides the inverse quantized value to the prediction reference value providing unit.

5. The apparatus of claim 1, wherein the packet change detection unit comprises:

a first packet change signal output unit which outputs a first packet change signal indicating whether or not the packet of a macro block to the left of the current macro block is the same as the packet of the current macro block, using a current packet change signal indicating whether or not the packet to which the current macro block belongs changed;

a storage unit which is formed with a plurality of storage areas of which number corresponds to the number of macro blocks forming X axis of a scene, and stores the current packet change signal in a storage area corresponding to a location of the current block on the X axis of the scene;

a selection signal generating unit which generates a selection signal indicating the location value on the X axis of the scene of the current macro block;

a first calculation unit which calculates a first output value using the selection signal and a value stored in the storage unit;

a second calculation unit which outputs a second packet change signal indicating whether or not the packet of a macro block immediately above the current macro block is the same as the packet to which the current macro block belongs, using the first output value and the current packet change signal; and a third calculation unit which outputs a third packet change signal indicating whether or not the packet of a macro block immediately above and to the left of the current macro block is the same as the packet to which the current macro block belongs, using the second packet change signal and a value stored in a storage area corresponding to the location on the X axis of the scene of the current macro block among storage areas forming the storage unit.

6. The apparatus of claim 5, wherein the current packet change signal is input to the packet change detection unit at a first clock, the first through third packet change signals are output at a second clock, the current packet change signal is stored in a storage area corresponding to the location on the X axis of the scene of the current macro block among storage areas forming the storage unit at a third clock, and the first through the third clocks are sequentially generated.

7. The apparatus of claim 5, wherein a storage area forming the storage unit is a 1-bit register.

8. The apparatus of claim 1, wherein the prediction reference value providing unit comprises:

a horizontal direction memory unit which has storage areas capable of storing a horizontal DCT component of a color difference signal block of a slice forming a scene and a horizontal DCT component of any one brightness signal block of an upper brightness signal block and a lower brightness signal block of a slice;

a vertical direction memory unit which has storage areas capable of storing a vertical DCT component of any one column of a vertical DCT component forming a slice;

an upper-left direction memory unit which has storage areas capable of storing the Direct Current (DC) component of a block immediately above and to the left of the current block for which prediction is currently performed; and a memory control unit which stores the DC component of a block immediately above the current block in the upper-left memory unit, stores the horizontal DCT component of the current block in the horizontal direction memory unit, and stores the vertical DCT component of the current block in the vertical direction memory unit.

9. The apparatus of claim 8, wherein the prediction reference value providing apparatus further comprises a prediction direction determining unit which determines a prediction direction using the DC component of the block to the left of the current block stored in the vertical direction memory unit, the DC component of the block immediately above the current block stored in the horizontal direction memory unit, and the DC component of the block immediately above and to the left of the current block.

10. The apparatus of claim 9, wherein the memory control unit provides the horizontal DCT component of the upper block of the current block from the horizontal direction memory unit to the calculation unit if the prediction direction output from the prediction direction determining unit is a first direction, and provides the vertical DCT component of the left-hand block of the current block from the vertical direction memory unit to the calculation unit if the prediction direction output from the prediction direction determining unit is a second direction.

11. The apparatus of claim 8, wherein the memory control unit stores the horizontal DCT component of the current block in the horizontal direction memory unit, replacing the horizontal DCT component of the upper block of the current block, and stores the vertical DCT component of the current block in the vertical direction memory unit, replacing the vertical DCT component of the left-hand block of the current block.

12. A method for predicting an image signal in a method for predictive coding or predictive decoding an image signal using a prediction memory which comprises a horizontal direction memory unit which has storage areas capable of storing horizontal DCT components of a slice forming a scene, a vertical direction memory unit which has storage areas capable of storing a vertical DCT component, and an upper-left memory unit storage areas capable of storing a DC component of a block immediately above and to the left of a current block for which prediction is performed, the method for prediction an image signal comprises:

(a) determining whether or not the packet to which the current macro block belongs is different from the packet of a macro block to the left of the current macro block, the macro block immediately above and to the left of the current block, or a macro block immediately above the current macro block, using a current packet change signal indicating whether or not the packet to which the current macro block belongs changed;

(b) if the packet to which the current macro block belongs is the same as the packet of the macro block to the left of the current macro block, the macro block immediately above and to the left of the current block, or the macro block immediately above the current macro block, determining the direction of prediction, using the DC component of the block to the left of the current block stored in the vertical direction memory unit, the DC component of the block immediately above the current block stored in the horizontal direction memory unit, and the DC component of the block immediately above and to the left of the current block;

(c) if the prediction direction is a first direction, outputting a reference prediction value by using a value stored in the vertical direction memory unit and if the prediction direction is a second direction, outputting a reference prediction value by using a value stored in the horizontal direction memory unit;

(d) if the packet to which the current macro block belongs is different from the packet of the macro block to the left of the current macro block, the macro block immediately above and to the left of the current block, or the macro block immediately above the current macro block, outputting a predetermined reference value;

(e) performing prediction calculation by using the reference prediction value of step (c) or the predetermined reference value of step (c) with the DCT component of the current block; and (f) storing the DCT component of the current block in the prediction memory.

13. The method for predicting an image signal of claim 12, wherein step (a) comprises:

(aa) generating a selection signal indicating the location value on the X axis of the scene of the current macro block;

(ab) outputting a first output value by using a value stored in a storage unit which is formed with a plurality of storage areas of which number corresponds to the number of macro blocks forming X axis of a scene, and stores the current packet change signal in a storage area corresponding to a location of the current block on the X axis of the scene, and the selection signal;

(ac) outputting a first packet change signal indicating whether or not the packet of the macro block to the left of the current macro block is the same as the packet of the current macro block, using a current packet change signal indicating whether or not the packet to which the current macro block belongs changed;

(ad) outputting a second packet change signal indicating whether or not the packet of the macro block immediately above the current macro block is the same as the packet to which the current macro block belongs, using the first output value and the current packet change signal; and (ae) outputting a third packet change signal indicating whether or not the packet of the macro block immediately above and to the left of the current macro block is the same as the packet to which the current macro block belongs, using the second packet change signal and a value stored in a storage area corresponding to the location on the X axis of the scene of the current macro block among storage areas forming the storage unit.

14. The method for predicting an image signal of claim 12, wherein in step (f), the DC component of the block immediately above the current block is stored in the upper-left direction memory unit, the horizontal DCT component of the current block is stored in the horizontal direction memory unit, and the vertical DCT component of the current block is stored in the vertical direction memory unit.

15. A computer readable medium having embodied thereon a computer program for implementing a method for predicting an image signal in a method for predictive coding or predictive decoding an image signal using a prediction memory which comprises a horizontal direction memory unit which has storage areas capable of storing horizontal DCT components of a slice forming a scene, a vertical direction memory unit which has storage areas capable of storing vertical DCT components, and an upper-left memory unit storage areas capable of storing a DC component of a upper left-hand block of a current block for which prediction is performed, the method for prediction an image signal comprises:

(a) determining whether or not the packet to which the current macro block belongs is different from the packet of a left-hand macro block of the current macro block, the upper left-hand macro block of the current macro block, or an upper macro block of the current macro block, using a current packet change signal indicating whether or not the packet to which the current macro block belongs changed;

(b) if the packet to which the current macro block belongs is the same as the packet of the left-hand macro block of the current macro block, the upper left-hand macro block of the current macro block, or the upper macro block of the current macro block, determining the direction of prediction, using the DC component of the left-hand block of the current block stored in the vertical direction memory unit, the DC component of the upper block of the current block stored in the horizontal direction memory unit, and the DC component of the upper left-hand block of the current block;

(c) if the prediction direction is a first direction, outputting a reference prediction value by using a value stored in the vertical direction memory unit and if the prediction direction is a second direction, outputting a reference prediction value by using a value stored in the horizontal direction memory unit;

(d) if the packet to which the current macro block belongs is different from the packet of the left-hand macro block of the current macro block, the upper left-hand macro block of the current macro block, or the upper macro block of the current macro block, outputting a predetermined reference value;

(e) performing prediction calculation by using the reference prediction value of step (c) or the predetermined reference value of step (c) with the DCT component of the current block; and (f) storing the DCT component of the current block in the prediction memory.

* * * * *